US010390362B2

(12) United States Patent
Gupta et al.

(10) Patent No.: US 10,390,362 B2
(45) Date of Patent: Aug. 20, 2019

(54) SIDELINK-CENTRIC SUBFRAME FOR WIRELESS COMMUNICATION

(71) Applicant: QUALCOMM Incorporated, San Diego, CA (US)

(72) Inventors: Piyush Gupta, Bridgewater, NJ (US); Chong Li, Weehawken, NJ (US); Joseph Binamira Soriaga, San Diego, CA (US); Tingfang Ji, San Diego, CA (US); Shailesh Patil, Raritan, NJ (US); Jing Jiang, San Diego, CA (US); Wei Zeng, San Diego, CA (US); Alexei Gorokhov, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 15/368,425

(22) Filed: Dec. 2, 2016

(65) Prior Publication Data

US 2017/0353971 A1    Dec. 7, 2017

Related U.S. Application Data

(60) Provisional application No. 62/346,155, filed on Jun. 6, 2016.

(51) Int. Cl.
*H04W 72/14*    (2009.01)
*H04W 72/12*    (2009.01)
(Continued)

(52) U.S. Cl.
CPC ........... *H04W 72/14* (2013.01); *H04W 72/12* (2013.01); *H04W 72/1284* (2013.01);
(Continued)

(58) Field of Classification Search
None
See application file for complete search history.

(56) References Cited

U.S. PATENT DOCUMENTS

| | | | |
|---|---|---|---|
| 8,787,240 B2 * | 7/2014 | Liu | H04B 7/2606 370/315 |
| 2007/0081485 A1 * | 4/2007 | Li | H04L 5/0094 370/328 |

(Continued)

FOREIGN PATENT DOCUMENTS

KR    20140034097 A    3/2014

OTHER PUBLICATIONS

International Search Report and Written Opinion—PCT/US2017/035828—ISA/EPO—dated Sep. 15, 2017.

*Primary Examiner* — Robert M Morlan
*Assistant Examiner* — Rodrick Mak
(74) *Attorney, Agent, or Firm* — Loza & Loza, LLP

(57) ABSTRACT

An apparatus may receive, from a scheduling entity, sidelink grant information in a downlink control channel. After receiving the grant information in the downlink control channel, the apparatus may transmit a request-to-send (RTS) signal comprising an indication of a requested duration of time to reserve a sidelink channel for sidelink data. If the sidelink channel is available for the requested duration of time, the apparatus may receive a clear-to-send (CTS) signal configured to indicate an availability of the sidelink channel for the requested duration of time. Subsequently, the apparatus may communicate, with another apparatus different from the scheduling entity, the sidelink data using the sidelink channel during the requested duration of time. Afterwards, the apparatus may communicate acknowledgment information corresponding to the communication of (Continued)

Sidelink-Centric Subframe (Unicast)

the sidelink signal with the other apparatus. Various additional and alternative aspects are described herein.

30 Claims, 18 Drawing Sheets

(51) Int. Cl.
*H04W 74/04* (2009.01)
*H04W 76/14* (2018.01)

(52) U.S. Cl.
CPC ....... *H04W 72/1289* (2013.01); *H04W 74/04* (2013.01); *H04W 76/14* (2018.02)

(56) References Cited

U.S. PATENT DOCUMENTS

| | | | |
|---|---|---|---|
| 2011/0317633 A1* | 12/2011 | Tan | H04W 74/08 370/329 |
| 2013/0308549 A1 | 11/2013 | Madan et al. | |
| 2014/0301383 A1* | 10/2014 | Sohn, III | H04B 7/0452 370/338 |
| 2014/0328329 A1 | 11/2014 | Novlan et al. | |
| 2015/0334752 A1* | 11/2015 | Li | H04W 74/0816 455/418 |
| 2016/0066337 A1* | 3/2016 | Sartori | H04W 76/023 370/329 |
| 2016/0338095 A1* | 11/2016 | Faurie | H04W 28/0278 |
| 2017/0094656 A1* | 3/2017 | Chen | H04W 72/0446 |
| 2018/0035448 A1* | 2/2018 | Gupta | H04W 72/1263 |
| 2018/0146484 A1* | 5/2018 | Kahtava | H04W 72/085 |

* cited by examiner

DL-Centric Subframe

UL-Centric Subframe

Sidelink-Centric Subframe (Unicast)

Sidelink-Centric Subframe (Broadcast)

Orthogonalized Broadcast

In-Band Broadcast

Tx-Yielding

Rx-Yielding under # US 10,390,362 B2

SIDELINK-CENTRIC SUBFRAME FOR WIRELESS COMMUNICATION

PRIORITY CLAIM

This application claims priority to and the benefit of provisional patent application No. 62/346,155, filed in the United States Patent and Trademark Office on Jun. 6, 2016, the entire content of which is incorporated herein by reference as if fully set forth below in its entirety and for all applicable purposes.

TECHNICAL FIELD

The technology discussed herein relates, generally, to wireless communication systems, and, more particularly, to wireless communication using a sidelink-centric subframe. Embodiments can provide and enable techniques for broadcast and unicast sidelink communication in a self-contained sidelink-centric subframe.

INTRODUCTION

In many existing wireless communication systems, a cellular network is implemented by enabling wireless user equipment to communicate with another by signaling with a nearby base station or cell. As a user equipment moves across the service area, handovers take place such that each user equipment maintains communication with one another via its respective best cell.

Another scheme for a wireless communication system is frequently referred to as a mesh or peer to peer (P2P) network, whereby wireless user equipment may signal one another directly, rather than via an intermediary base station or cell.

Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without passing through the base station. In some circumstances, these UE-to-UE sidelink communications may potentially interfere with base station-to-UE communications and/or other UE-to-UE communications. Interference management in such circumstances may enhance communication efficiency and throughout, thereby improving the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method of sidelink communication by a first scheduled entity is disclosed. The method includes receiving, from a scheduling entity, sidelink grant information in a downlink control channel. The method further includes, after receiving the sidelink grant information in the downlink control channel, transmitting a request signal including an indication of a requested duration of time to reserve a sidelink channel for sidelink data. The method further includes communicating, with a second scheduled entity, the sidelink data using the sidelink channel during the requested duration of time. In this example, the receiving the sidelink grant information, the transmitting the request signal, and the communicating the sidelink data occur in a single transmission time interval (TTI).

In another example a method of sidelink communication by a first scheduled entity is disclosed. The method includes receiving from a scheduling entity during a first transmission time interval (TTI), sidelink grant information in a downlink control channel. The method further includes, after receiving the sidelink grant information in the downlink control channel, during the first TTI, transmitting a request signal including an indication of a requested duration of time to reserve a sidelink channel for sidelink data, and further transmitting a destination identifier configured to identify a second scheduled entity or a group destination identifier configured to identify a group of entities including the second scheduled entity. The method further includes receiving a response signal from a third scheduled entity during the first TTI, the response signal including a reference signal (RS) indicating a higher priority sidelink channel reservation. The method further includes forgoing communication of sidelink data on the sidelink channel during the first TTI based on the RS.

In another example a method of sidelink communication by a first scheduled entity is disclosed. The method includes receiving from a scheduling entity during a first transmission time interval (TTI), sidelink grant information in a downlink control channel. The method further includes monitoring for a primary request signal within a primary request portion of the first TTI. The method further includes, if the primary request signal is not detected within the primary request portion of the first TTI, transmitting a secondary request signal including an indication of a requested duration of time to reserve a sidelink channel for sidelink data. The method further includes, if the primary request signal is detected within the primary request portion of the first TTI, forgoing communication on the sidelink channel for a reserved duration of time indicated in the primary request signal.

In another example a method of sidelink communication by a first scheduled entity is disclosed. The method includes receiving, from a scheduling entity, sidelink grant information in a downlink control channel. The method further includes, after receiving the sidelink grant information in the downlink control channel, receiving from a second scheduled entity a request signal including an indication of a requested duration of time to reserve a sidelink channel for sidelink data. The method further includes, in response to the request signal, transmitting to the second scheduled entity a response signal configured to indicate an availability of the sidelink channel for the requested duration of time. The method further includes communicating, with the second scheduled entity, the sidelink data using the sidelink channel during the requested duration of time. In this example, the receiving the sidelink grant information, the receiving the request signal, the transmitting the response signal, and the communicating the sidelink data occur in a single transmission time interval (TTI).

In another example, a scheduled entity (e.g., a "first" scheduled entity") configured for sidelink communication is disclosed. The first scheduled entity includes a processor, a memory communicatively coupled to the processor, and a transceiver communicatively coupled to the processor. Here, the processor is configured to receive, from a scheduling entity via the transceiver, sidelink grant information in a downlink control channel. The processor is further configured to, after receiving the sidelink grant information in the downlink control channel, transmit a request signal via the transceiver, the request signal including an indication of a requested duration of time to reserve a sidelink channel for sidelink data. The processor is further configured to communicate with a second scheduled entity, via the transceiver, the sidelink data using the sidelink channel during the requested duration of time. In this example, the receiving the sidelink grant information, the transmitting the request signal, and the communicating the sidelink data occur in a single transmission time interval (TTI).

In another example, a scheduled entity (e.g., a "first" scheduled entity") configured for sidelink communication is disclosed. The first scheduled entity includes a processor, a memory communicatively coupled to the processor, and a transceiver communicatively coupled to the processor. Here, the processor is configured to receive, from a scheduling entity via the transceiver, during a first transmission time interval (TTI), sidelink grant information in a downlink control channel. The processor is further configured to, after receiving the sidelink grant information in the downlink control channel, during the first TTI, transmit a request signal via the transceiver, the request signal including an indication of a requested duration of time to reserve a sidelink channel for sidelink data, and further transmitting a destination identifier configured to identify a second scheduled entity or a group destination identifier configured to identify a group of entities including the second scheduled entity. The processor is further configured to receive a response signal via the transceiver from a third scheduled entity during the first TTI, the response signal including a reference signal (RS) indicating a higher priority sidelink channel reservation. The processor is further configured to forgo communication of sidelink data on the sidelink channel during the first TTI based on the RS.

In another example, a scheduled entity (e.g., a "first" scheduled entity") configured for sidelink communication is disclosed. The first scheduled entity includes a processor, a memory communicatively coupled to the processor, and a transceiver communicatively coupled to the processor. Here, the processor is configured to receive from a scheduling entity via the transceiver, during a first transmission time interval (TTI), sidelink grant information in a downlink control channel. The processor is further configured to monitor, via the transceiver, for a primary request signal within a primary request portion of the first TTI. The processor is further configured to, if the primary request signal is not detected within the primary request portion of the first TTI, transmit a secondary request signal via the transceiver, the secondary request signal including an indication of a requested duration of time to reserve a sidelink channel for sidelink data. The processor is further configured to, if the primary request signal is detected within the primary request portion of the first TTI, forgo communication on the sidelink channel for a reserved duration of time indicated in the primary request signal.

In another example, a scheduled entity (e.g., a "first" scheduled entity") configured for sidelink communication is disclosed. The first scheduled entity includes a processor, a memory communicatively coupled to the processor, and a transceiver communicatively coupled to the processor. Here, the processor is configured to receive, from a scheduling entity via the transceiver, sidelink grant information in a downlink control channel. The processor is further configured to, after receiving the sidelink grant information via the transceiver in the downlink control channel, receive from a second scheduled entity, via the transceiver, a request signal including an indication of a requested duration of time to reserve a sidelink channel for sidelink data. The processor is further configured to, in response to the request signal, transmit to the second scheduled entity via the transceiver a response signal configured to indicate an availability of the sidelink channel for the requested duration of time. The processor is further configured to communicate with the second scheduled entity, via the transceiver, the sidelink data using the sidelink channel during the requested duration of time. In this example, the receiving the sidelink grant information, the receiving the request signal, the transmitting the response signal, and the communicating the sidelink data occur in a single transmission time interval (TTI).

In another example, a computer-readable medium storing computer executable code at a first scheduled entity is disclosed. Here, the computer-executable code includes instructions for causing the first scheduled entity to receive, from a scheduling entity, sidelink grant information in a downlink control channel. The computer-executable code further includes instructions for causing the first scheduled entity, after receiving the sidelink grant information in the downlink control channel, to transmit a request signal including an indication of a requested duration of time to reserve a sidelink channel for sidelink data. The computer-executable code further includes instructions for causing the first scheduled entity to communicate, with a second scheduled entity, the sidelink data using the sidelink channel during the requested duration of time. In this example, the receiving the sidelink grant information, the transmitting the request signal, and the communicating the sidelink data occur in a single transmission time interval (TTI).

In another example, a computer-readable medium storing computer executable code at a first scheduled entity is disclosed. Here, the computer-executable code includes instructions for causing the first scheduled entity to receive from a scheduling entity during a first transmission time interval (TTI), sidelink grant information in a downlink control channel. The computer-executable code further includes instructions for causing the first scheduled entity, after receiving the sidelink grant information in the downlink control channel, during the first TTI, to transmit a request signal including an indication of a requested duration of time to reserve a sidelink channel for sidelink data, and further transmitting a destination identifier configured to identify a second scheduled entity or a group destination identifier configured to identify a group of entities including the second scheduled entity. The computer-executable code further includes instructions for causing the first scheduled entity to receive a response signal from a third scheduled entity during the first TTI, the response signal including a reference signal (RS) indicating a higher priority sidelink channel reservation. The computer-executable code further includes instructions for causing the first scheduled entity to forgo communication of sidelink data on the sidelink channel during the first TTI based on the RS.

In another example, a computer-readable medium storing computer executable code at a first scheduled entity is disclosed. Here, the computer-executable code includes instructions for causing the first scheduled entity to receive from a scheduling entity during a first transmission time interval (TTI), sidelink grant information in a downlink control channel. The computer-executable code further includes instructions for causing the first scheduled entity to monitor for a primary request signal within a primary request portion of the first TTI. The computer-executable code further includes instructions for causing the first scheduled entity, if the primary request signal is not detected within the primary request portion of the first TTI, to transmit a secondary request signal including an indication of a requested duration of time to reserve a sidelink channel for sidelink data. The computer-executable code further includes instructions for causing the first scheduled entity, if the primary request signal is detected within the primary request portion of the first TTI, to forgo communication on the sidelink channel for a reserved duration of time indicated in the primary request signal.

In another example, a computer-readable medium storing computer executable code at a first scheduled entity is disclosed. Here, the computer-executable code includes instructions for causing the first scheduled entity to receive, from a scheduling entity, sidelink grant information in a downlink control channel. The computer-executable code further includes instructions for causing the first scheduled entity, after receiving the sidelink grant information in the downlink control channel, to receive from a second scheduled entity a request signal including an indication of a requested duration of time to reserve a sidelink channel for sidelink data. The computer-executable code further includes instructions for causing the first scheduled entity, in response to the request signal, to transmit to the second scheduled entity a response signal configured to indicate an availability of the sidelink channel for the requested duration of time. The computer-executable code further includes instructions for causing the first scheduled entity to communicate, with the second scheduled entity, the sidelink data using the sidelink channel during the requested duration of time. In this example, the receiving the sidelink grant information, the receiving the request signal, the transmitting the response signal, and the communicating the sidelink data occur in a single transmission time interval (TTI).

In another example, a scheduled entity (e.g., a "first" scheduled entity) configured for sidelink communication is disclosed. In this example, the first scheduled entity includes means for receiving, from a scheduling entity, sidelink grant information in a downlink control channel. The first scheduled entity further includes means for, after receiving the sidelink grant information in the downlink control channel, transmitting a request signal including an indication of a requested duration of time to reserve a sidelink channel for sidelink data. The first scheduled entity further includes means for communicating, with a second scheduled entity, the sidelink data using the sidelink channel during the requested duration of time. In this example, the receiving the sidelink grant information, the transmitting the request signal, and the communicating the sidelink data occur in a single transmission time interval (TTI).

In another example, a scheduled entity (e.g., a "first" scheduled entity) configured for sidelink communication is disclosed. In this example, the first scheduled entity includes means for receiving from a scheduling entity during a first transmission time interval (TTI), sidelink grant information in a downlink control channel. The first scheduled entity further includes means for, after receiving the sidelink grant information in the downlink control channel, during the first TTI, transmitting a request signal including an indication of a requested duration of time to reserve a sidelink channel for sidelink data, and further transmitting a destination identifier configured to identify a second scheduled entity or a group destination identifier configured to identify a group of entities including the second scheduled entity. The first scheduled entity further includes means for receiving a response signal from a third scheduled entity during the first TTI, the response signal including a reference signal (RS) indicating a higher priority sidelink channel reservation. The first scheduled entity further includes means for forgoing communication of sidelink data on the sidelink channel during the first TTI based on the RS.

In another example, a scheduled entity (e.g., a "first" scheduled entity) configured for sidelink communication is disclosed. In this example, the first scheduled entity includes means for receiving from a scheduling entity during a first transmission time interval (TTI), sidelink grant information in a downlink control channel. The first scheduled entity further includes means for monitoring for a primary request signal within a primary request portion of the first TTI. The first scheduled entity further includes means for, if the primary request signal is not detected within the primary request portion of the first TTI, transmitting a secondary request signal including an indication of a requested duration of time to reserve a sidelink channel for sidelink data. The first scheduled entity further includes means for, if the primary request signal is detected within the primary request portion of the first TTI, forgoing communication on the sidelink channel for a reserved duration of time indicated in the primary request signal.

In another example, a scheduled entity (e.g., a "first" scheduled entity) configured for sidelink communication is disclosed. In this example, the first scheduled entity includes means for receiving, from a scheduling entity, sidelink grant information in a downlink control channel. The first scheduled entity further includes means for, after receiving the sidelink grant information in the downlink control channel, receiving from a second scheduled entity a request signal including an indication of a requested duration of time to reserve a sidelink channel for sidelink data. The first scheduled entity further includes means for, in response to the request signal, transmitting to the second scheduled entity a response signal configured to indicate an availability of the sidelink channel for the requested duration of time. The first scheduled entity further includes means for communicating, with the second scheduled entity, the sidelink data using the sidelink channel during the requested duration of time. In this example, the receiving the sidelink grant information, the receiving the request signal, the transmitting the response signal, and the communicating the sidelink data occur in a single transmission time interval (TTI).

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
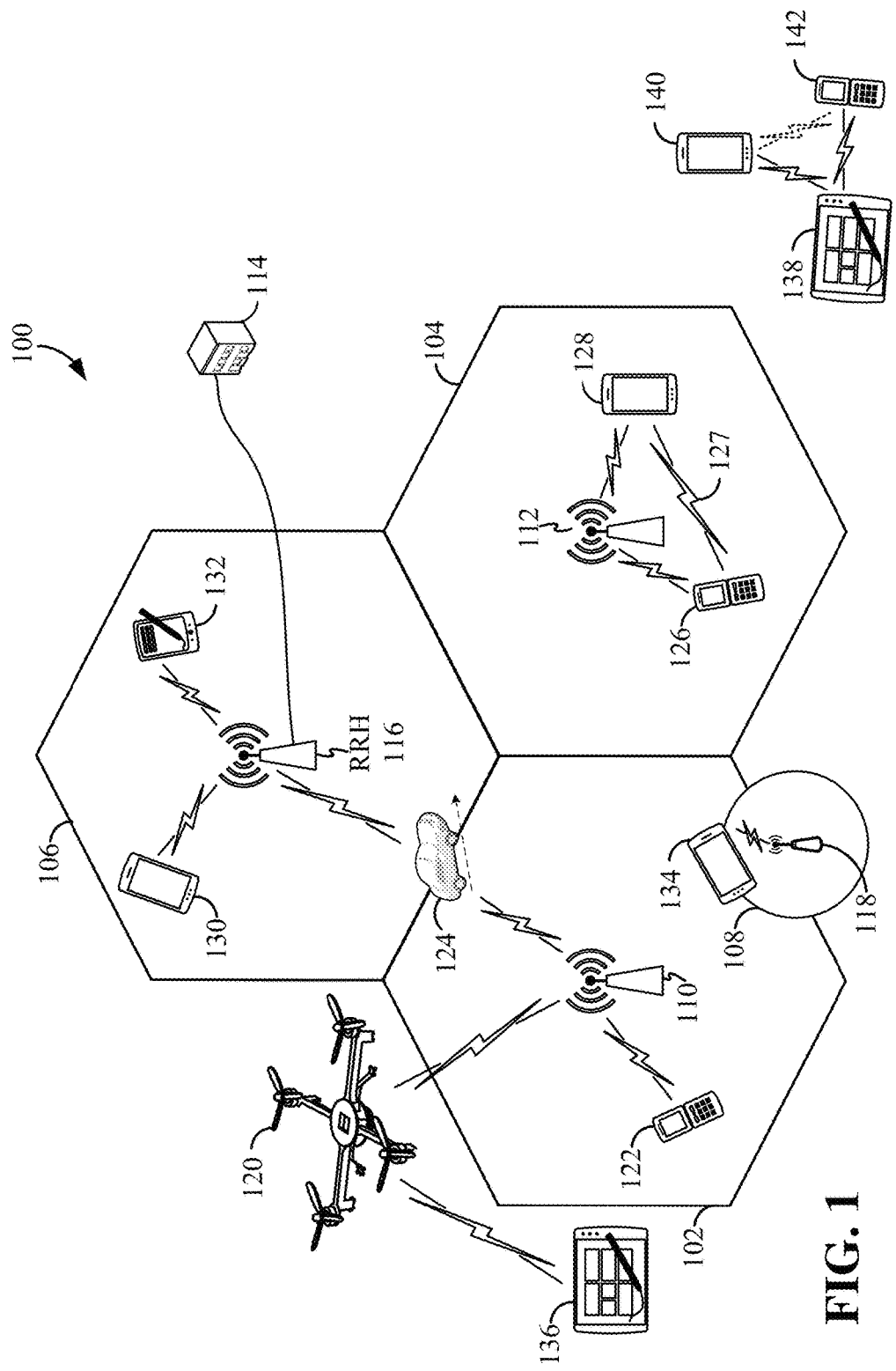
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device may additionally be a digital home or smart home device such as a home audio, video, and/or multimedia device, an appliance, a sensor, a vending machine, intelligent lighting, a home security system, a smart meter, etc. A mobile apparatus may additionally be a smart energy or security device, a solar panel or solar array, municipal lighting, water, or other infrastructure; industrial automation and enterprise device, etc. Still further, a mobile apparatus may provide for telemedicine support, or health care at a distance. Telehealth devices may include telehealth monitoring devices and telehealth administration devices, whose communication may be given preferential treatment or prioritized access over other types of information, e.g., in terms of prioritized access for transport of critical service data; and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI may refer to a time interval that includes a schedulable set of data (e.g., including one or more transport blocks). In accordance with various aspects of the present disclosure, a subframe may include one or more TTIs. Thus, as further used herein, the term subframe refers to an encapsulated set of information including one or more TTIs, which is capable of being independently decoded. Multiple subframes may be grouped together to form a single frame. Any suitable number of subframes may occupy a frame. In addition, a subframe may have any suitable duration (e.g., 250 μs, 500 μs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In various aspects of the disclosure, an access network 100 may utilize DL-based mobility or UL-based mobility to enable mobility and handovers from one cell to another. In a network configured for DL-based mobility, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals may be utilized by the network to select a serving cell for a UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
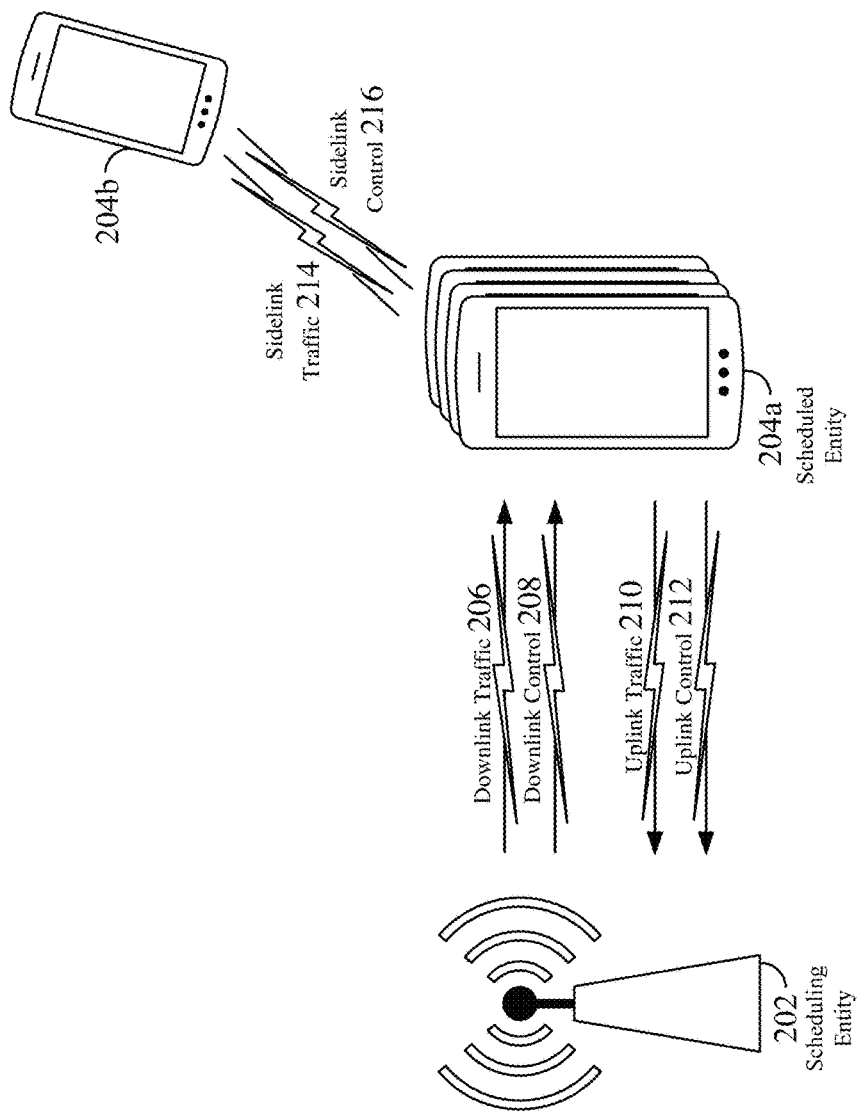
FIG. 2 is a diagram conceptually illustrating an example of a scheduling entity communicating with one or more scheduled entities according to some aspects of the present disclosure.

Thus, in a wireless communication network with a scheduled access to time-frequency resources and having a cellular configuration, a P2P configuration, and a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may be additionally transmitted between the scheduling entity 202 and the scheduled entity 204. Transmissions of the control and data information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a request signal such as a source transmit signal (STS) and a direction selection signal (DSS), a response signal such as a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink data information 214. The PSHICH may include HARQ acknowledgment information and/or a HARQ indicator from a destination device, so that the destination may acknowledge data received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
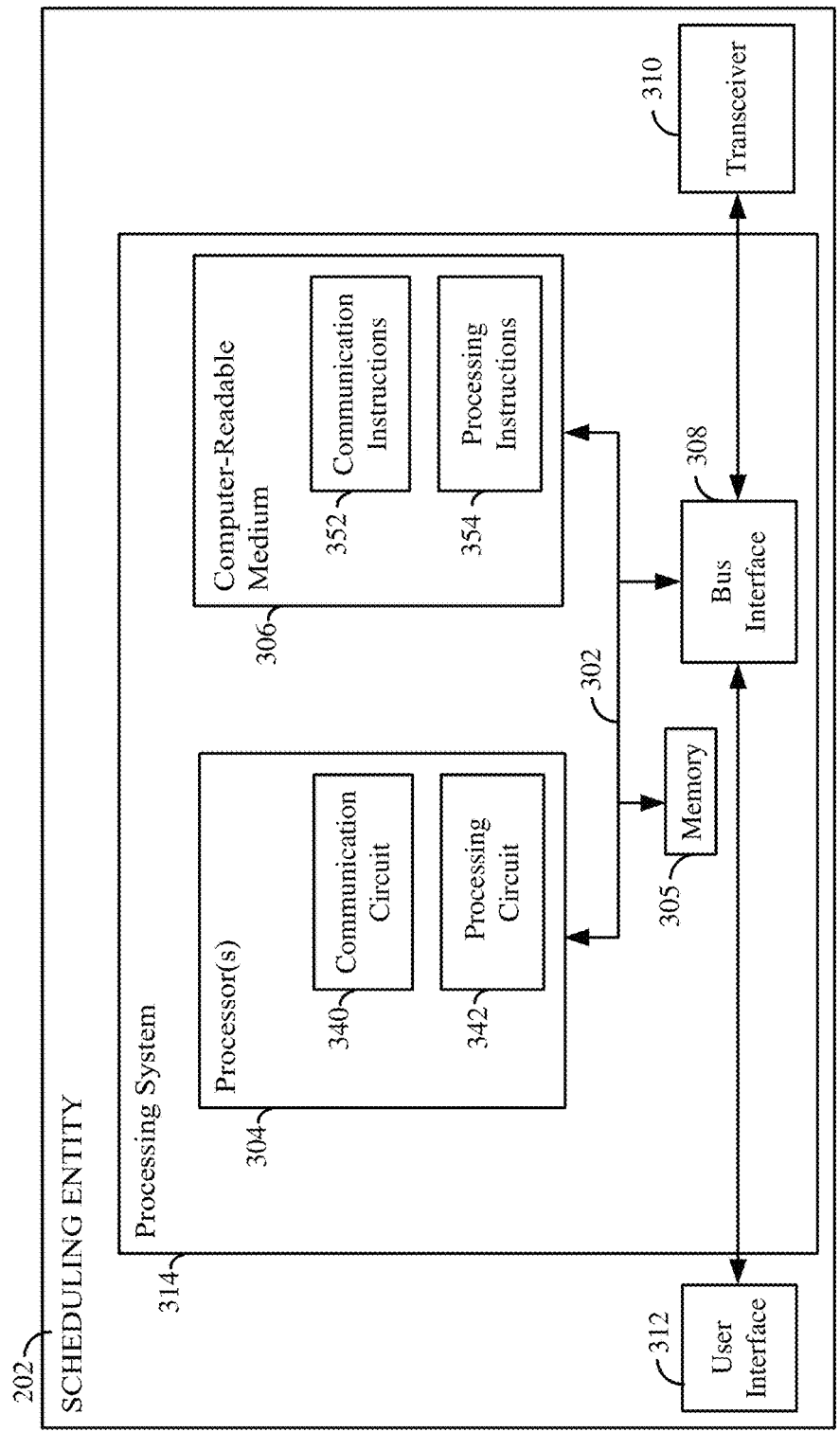
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. The scheduling entity 202 may employ a processing system 314. For example, the scheduling entity 202 may be a user equipment (UE) as illustrated in any one or more of FIGS. 1, 2, and/or 10. In another example, the scheduling entity 202 may be a base station as illustrated in FIG. 1.

The scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein, for example, in FIGS. 7-13 and/or 15-18.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

The processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium may include, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. A computer-readable medium may also include a transitory computer-readable medium, for example, a carrier wave, a transmission line, or any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein. The instructions included in the computer-readable medium 306 are provided as non-limiting examples. Other instructions configured to carry out the described functions exist and are included within various aspects of the present disclosure.

Figure 4:
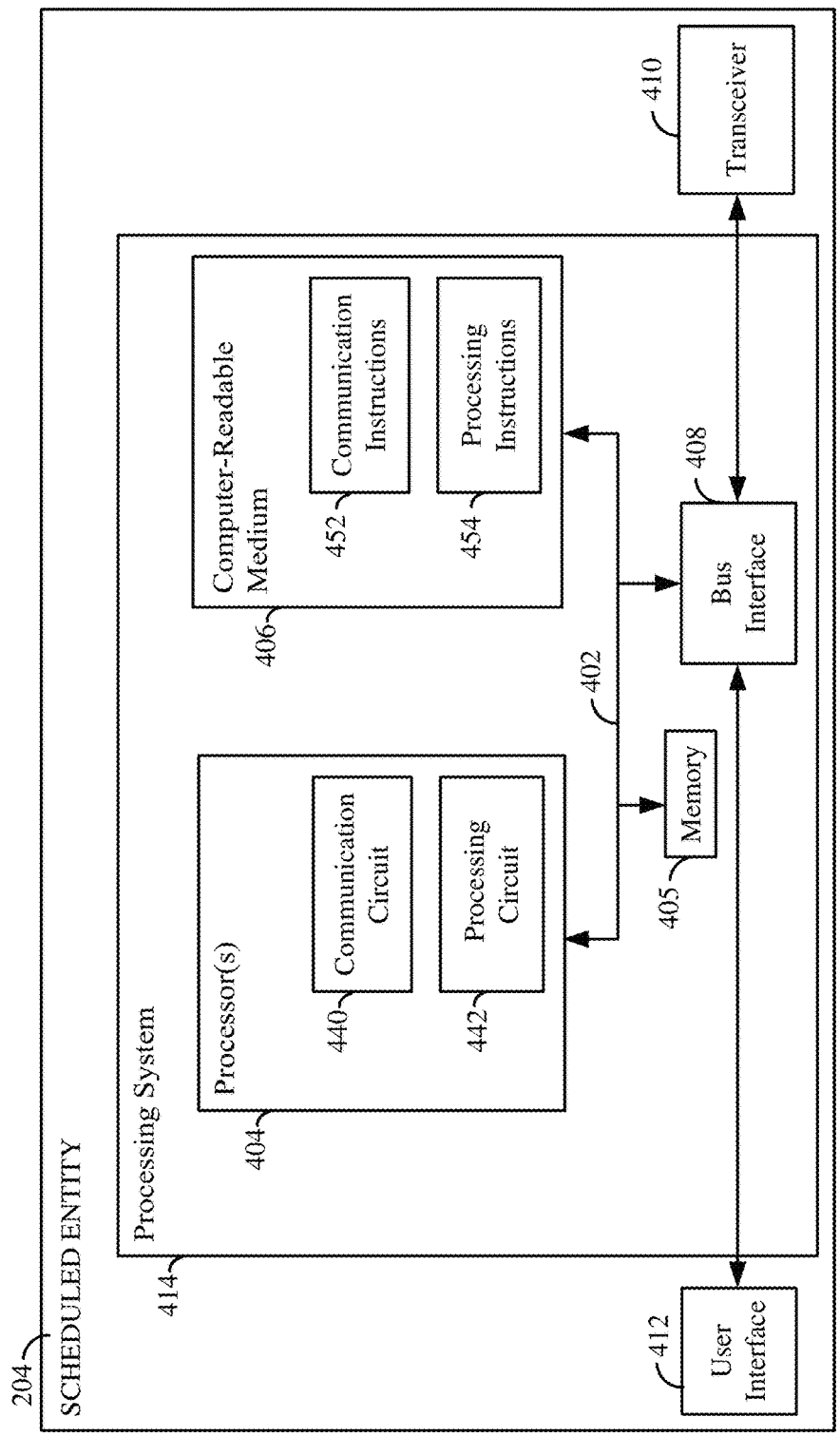
FIG. 4 is a diagram illustrating an example of a hardware implementation for a scheduled entity according to some aspects of the present disclosure.

FIG. 4 is a block diagram illustrating an example of a hardware implementation for an exemplary scheduled entity 204 according to aspects of the present disclosure. The scheduled entity 204 may employ a processing system 414. The scheduled entity 204 may be implemented with a processing system 414 that includes one or more processors 404. For example, the scheduled entity 204 may be a user equipment (UE) as illustrated in any one or more of FIGS. 1, 2, and/or 10.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used to implement any one or more of the processes described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code including instructions configured to perform various processes described herein. The instructions included in the computer-readable medium 406 are provided as non-limiting examples. Other instructions configured to carry out the described functions exist and are included within various aspects of the present disclosure.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

The processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein. The instructions included in the computer-readable medium 406 are provided as non-limiting examples. Other instructions configured to carry out the described functions exist and are included within various aspects of the present disclosure.

Subframe Structure

Figure 5:
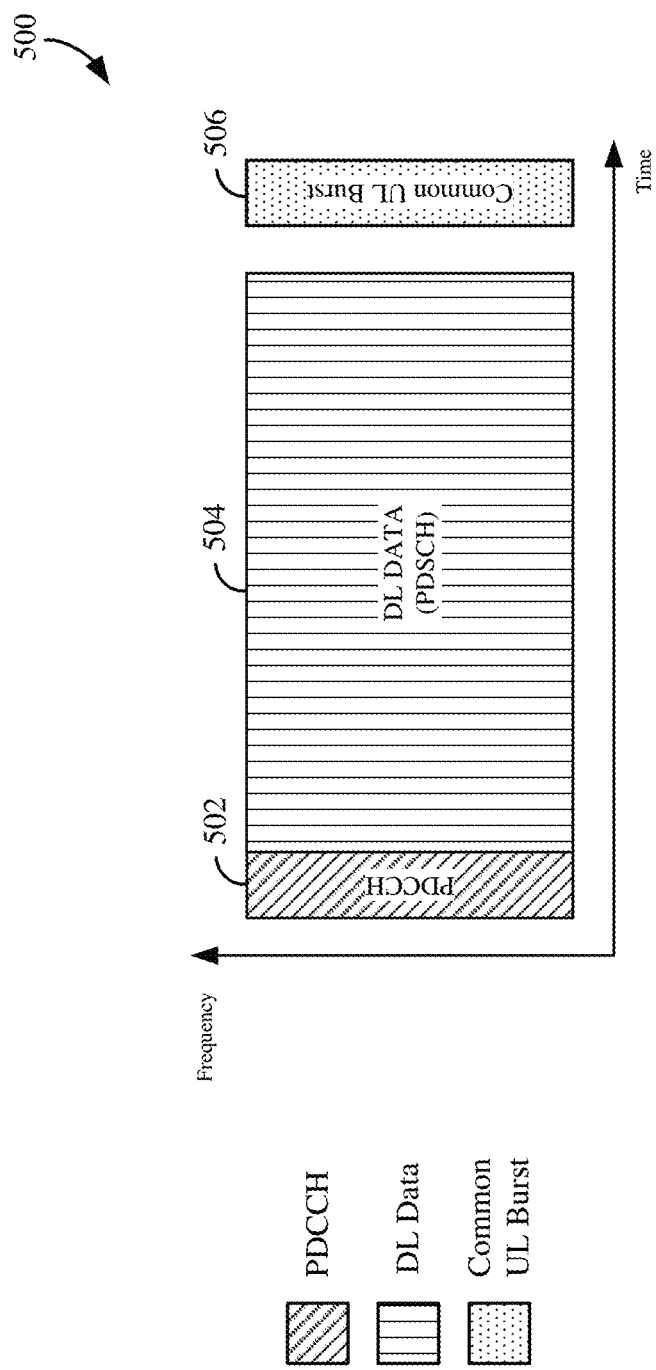
FIG. 5 is a diagram illustrating an example of a downlink (DL)-centric subframe according to some aspects of the present disclosure.

FIGS. 5-13 are schematic diagrams that illustrate the structure of various subframe formats according to a variety of aspects of this disclosure. As illustrated in FIG. 5, in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments. FIG. 5 is a diagram showing an example of a DL-centric subframe 500. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. Additional description related to the PDCCH is provided further below with reference to various other FIGS. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the scheduled entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
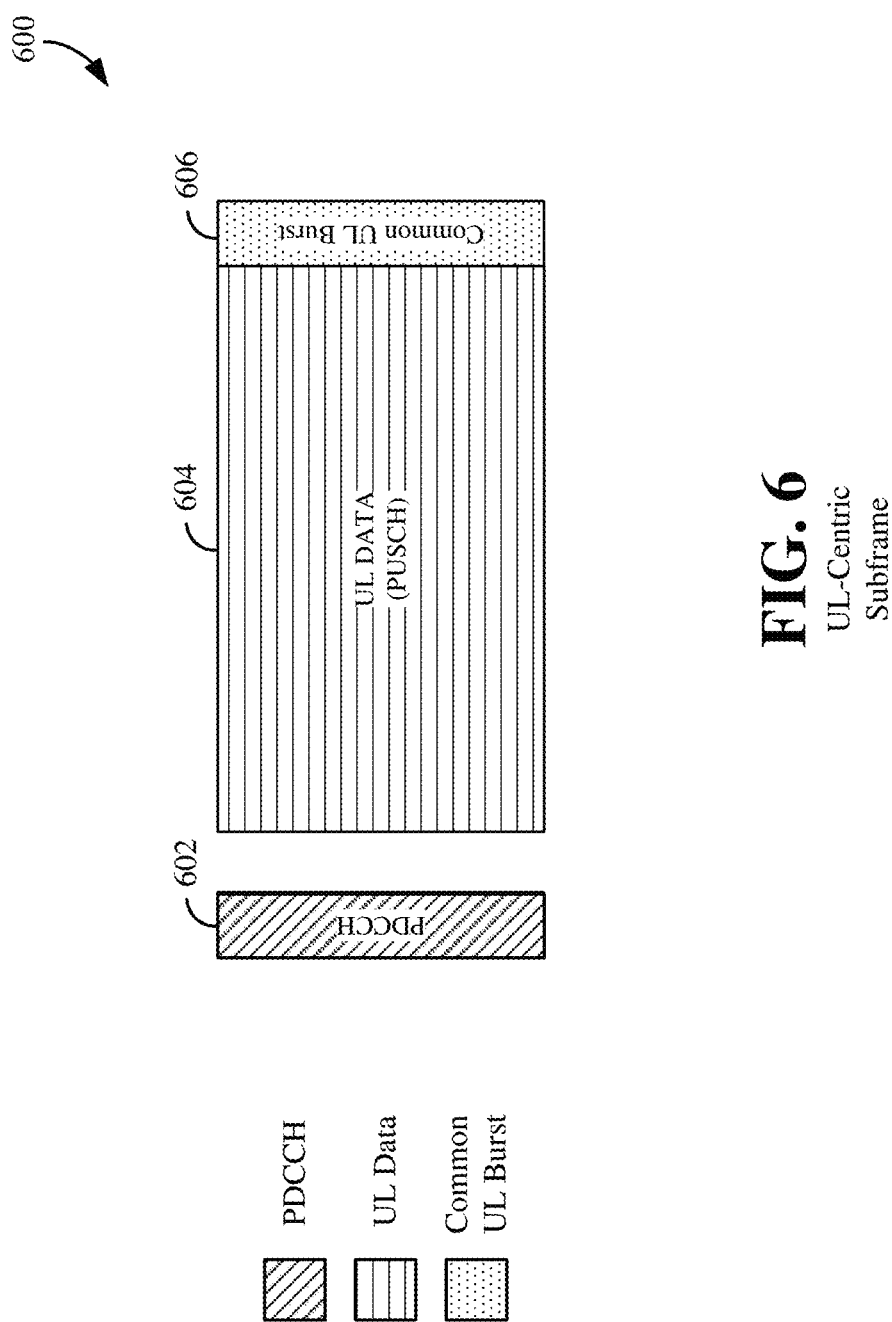
FIG. 6 is a diagram illustrating an example of an uplink (UL)-centric subframe according to some aspects of the present disclosure.

FIG. 6 is a diagram showing an example of an UL-centric subframe 600. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. The UL portion may refer to the communication resources utilized to communicate UL data from the scheduled entity 204 (e.g., UE) to the scheduling entity 202 (e.g., eNB). In some configurations, the control portion 602 may be a physical UL shared channel (PUSCH). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 506 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Sidelink

In some circumstances, two or more scheduled entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one scheduled entity 204 (e.g., $UE_1$) to another scheduled entity 204 (e.g., $UE_2$) without relaying that communication through the scheduling entity 202 (e.g., eNB), even though the scheduling entity 202 (e.g., eNB) may be utilized for scheduling and/or control purposes. In some examples, the sidelink signals may be communicated using a licensed spectrum (unlike wireless local area networks, which typically use an unlicensed spectrum).

However, sidelink signals may increase the relative likelihood of signal interference in certain circumstances. For example, without the aspects described in the present disclosure, interference may occur between the sidelink signals and the DL/UL control/scheduling information of nominal traffic. That is, the DL/UL control/scheduling information of nominal traffic may not be as well protected. As another example, without the aspects described in the present disclosure, interference may occur between sidelink signals originating from different scheduled entities 204 (e.g., UEs). That is, concurrently transmitted sidelink signals may collide and/or interfere with each other. Aspects of the present disclosure provide for a sidelink-centric subframe that enables distributed scheduling and signal interference management.

Unicast Sidelink Subframe

Figure 7:
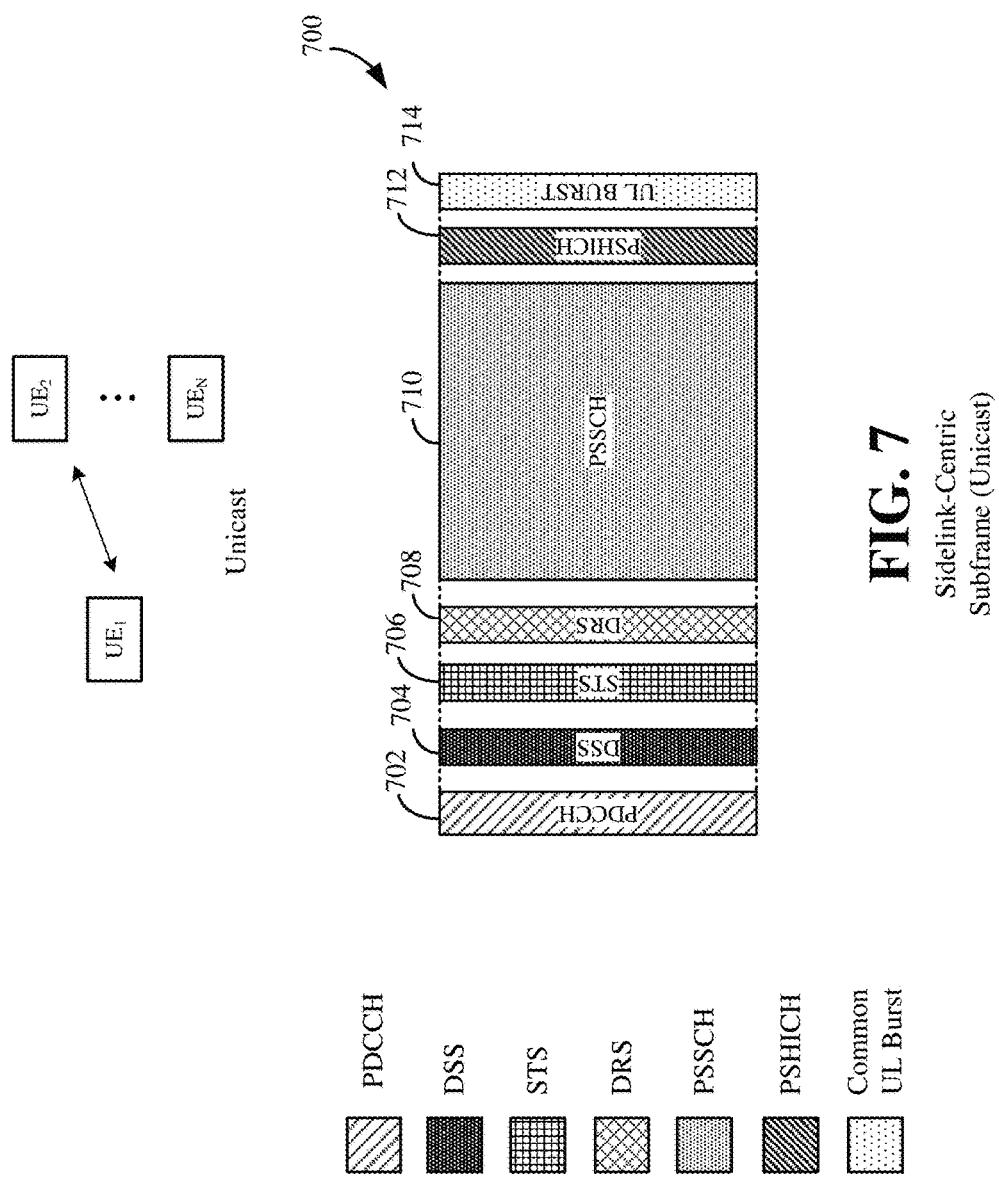
FIG. 7 is a diagram illustrating an example of a sidelink-centric subframe for unicast according to some aspects of the present disclosure.

FIG. 7 is a diagram illustrating another example of a sidelink-centric subframe 700 according to some aspects of the present disclosure. In some configurations, this sidelink-centric subframe, or a subframe having similar structure, may be utilized for a unicast communication. A unicast communication may refer to a point-to-point transmission by a scheduled entity 204 (e.g., $UE_1$) to a particular scheduled entity 204 (e.g., $UE_2$).

In each of the sidelink-centric subframes that follow, as described below, for a given device, certain fields or portions of the subframe may correspond to transmissions from that device or reception at that device, depending on whether that given device is transmitting sidelink traffic or receiving sidelink traffic. As illustrated in each of FIGS. 7-13, a time gap (e.g., guard interval, guard period, etc.) between adjacent data portions, if any, may enable a device to transition from a listening/receiving state (e.g., during DSS 704 for a non-primary device) to a transmitting state (e.g., during STS 706 for a non-primary device); and/or to transition from a transmitting state (e.g., during STS 706 for a non-primary device) to a listening/receiving state (e.g., during DRS 708 for either a primary or non-primary transmitting device). The duration of such a time gap or guard interval may take any suitable value, and it should be understood that the illustrations in FIGS. 7-13 are not to scale with respect to time. Many such time gaps are illustrated in the various illustrations to represent some aspects of particular embodiments, but it should be understood that the illustrated time gaps may be wider or narrower than they appear, and in some examples, an illustrated time gap may not be utilized, while in other examples, the lack of a time gap might be replaced with a suitable time gap between regions of a subframe. In some aspects of the disclosure, a particular subframe may be structured with time gaps corresponding to TX-RX transitions as well as RX-TX transitions, in order that the same subframe structure may accommodate the operation of a given device both when that device is transmitting sidelink traffic, and when that device is receiving sidelink traffic.

In the example illustrated in FIG. 7, the sidelink-centric subframe includes a control portion 702, which may be a physical downlink control channel (PDCCH). In some aspects, the control portion 702 may be a common DL portion configured the same as or similar to the control portion 502 (e.g., PDCCH) described in greater detail above with reference to FIG. 5. Additionally or alternatively, the control portion 702 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 7, the control portion 702 may be included in the beginning or initial portion of the sidelink-centric subframe 700. By including the control portion 702 in the beginning or initial portion of the sidelink-centric subframe 700, the likelihood of interfering with the control portions 502, 602 of DL-centric and UL-centric subframes of nominal traffic is minimized. In other words, because the DL-centric subframe 500, the UL-centric subframe 600, and the sidelink-centric subframe 700 have their DL control information communicated during a common portion of their respective subframes, the likelihood of interference between the DL control information and the sidelink signals is minimized. That is, the control portions 502, 602 of DL-centric and UL-centric subframes (of nominal traffic) are relatively better protected.

The sidelink-centric subframe 700 may further include a primary request signal such as a direction selection signal (DSS) 704, and a secondary request signal such as a source transmit signal (STS) 706. In various examples, the content of the DSS and the STS may take different formats. As one example, the DSS 704 may be utilized for direction selection and the STS 706 may be utilized as a request signal. Here, direction selection refers to the selection whether a primary sidelink device transmits a request signal in the STS, or whether a primary sidelink device receives a request signal (i.e., a non-primary or secondary sidelink device transmits a request signal in the STS). In this example, the DSS may include a destination ID (e.g., corresponding to a non-primary or secondary sidelink device) and a direction indication. In this manner, a listening sidelink device that receives the DSS transmission and is not the device corresponding to the destination ID need not necessarily be active and monitoring for the STS transmission. In this example, the STS may include an indication of a requested duration of time to reserve a sidelink channel for sidelink data. Accordingly, with the DSS/STS portions of the sidelink-centric subframe 700, a request for reservation of the sidelink channel in a desired direction between a primary and a non-primary sidelink device may be established.

In another example, content of the DSS 704 and the STS 706 may be substantially similar to one another, although the DSS 704 may be utilized by a primary sidelink device and the STS 706 may be utilized by a secondary sidelink device. The DSS and/or STS may be utilized by a scheduled entity 204 (e.g., UE) as a request signal to indicate a requested duration of time to keep a sidelink channel available for a sidelink signal. One of ordinary skill in the art will understand that the DSS and/or STS may include various additional or alternative information without necessarily deviating from the scope of the present disclosure. In some configurations, the DSS and/or STS may include a destination identifier (ID). The destination ID may correspond to a specific apparatus intended to receive the DSS/STS (e.g., $UE_2$). In some configurations, the DSS and/or STS may indicate a duration of the sidelink transmission, and/or may include a reference signal to enable channel estimation and RX-yielding (described below), a modulation and coding scheme (MCS) indicator, and/or various other information. Here, the MCS indicator may be utilized to inform the receiving device of the MCS utilized for transmissions in the data portion 706.

A primary device may transmit a primary request signal (e.g., a DSS) during a primary request portion of a subframe (e.g., DSS portion 704), and a non-primary device (e.g., a secondary device) may transmit a secondary request signal (e.g., an STS) during a secondary request portion of the subframe (e.g., STS portion 706). A primary device may refer to a device (e.g., a UE or scheduled entity 204) that has priority access to the sidelink channel. During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., base station). The relay device may experience relatively less path loss (when communicating with the scheduling entity 202 (e.g., base station)) relative to the path loss experienced by the non-relay device.

During the DSS portion 704, the primary device transmits a DSS, and the non-primary device listens for the DSS from a primary device. On the one hand, if the non-primary device detects a DSS during the DSS portion 704, then the non-primary device will not transmit an STS during STS 706. On the other hand, if the non-primary device does not detect a DSS during the DSS portion 704, then the non-primary device may transmit an STS during the STS portion 706.

If the sidelink channel is available for the requested duration of time, an apparatus identified or addressed by the destination ID in the STS/DSS, which receives the STS/DSS, may communicate a destination receive signal (DRS) during the DRS portion 708. The DRS may indicate availability of the sidelink channel for the requested duration of time. The DRS may additionally or alternatively include other information, such as a source ID, a duration of the transmission, a signal to interference plus noise ratio (SINR) (e.g., of the received RS from the source device), an RS to enable TX-yielding, CQI information, and/or various other suitable types of information. The exchange of DSS/STS and DRS enable the scheduled entities 204 (e.g., UEs) performing the sidelink communications to negotiate the availability of the sidelink channel prior to the communication of the sidelink signal, thereby minimizing the likelihood of interfering sidelink signals. In other words, without the DSS/STS and DRS, two or more scheduled entities 204 (e.g., UEs) might concurrently transmit sidelink signals using the same resources of the sidelink data portion 710, thereby causing a collision and resulting in avoidable retransmissions.

The sidelink-centric subframe may also include a sidelink data portion 710. The sidelink data portion 710 may sometimes be referred to as the payload or sidelink-burst of the sidelink-centric subframe. In an example where the sidelink-centric subframe is utilized for unicast transmissions, the sidelink data portion 710 may carry a physical sidelink shared channel (PSSCH). The sidelink data portion 710 may include the communication resources utilized to communicate sidelink data from one scheduled entity 204 (e.g., $UE_1$) to a second scheduled entity 204 (e.g., $UE_2$). In some configurations, the MCS of the sidelink signal communicated in the sidelink data portion 710 may be selected based on the CQI feedback included in the DRS 708.

The sidelink-centric subframe may also include a sidelink acknowledgment portion 712. In some aspects the sidelink acknowledgment portion 712 may carry a physical sidelink HARQ indicator channel (PSHICH). After communicating the sidelink signal in the sidelink data portion 710, acknowledgment information may be communicated between the scheduled entities 204 (e.g., UEs) utilizing the sidelink acknowledgment portion 712. Non-limiting examples of such acknowledgment information may include an ACK signal, a NACK signal, a HARQ indicator, and/or various other suitable types of acknowledgment information. For example, after receiving and successfully decoding a sidelink signal from $UE_1$ in the sidelink data portion 710, $UE_2$ may transmit an ACK signal to the $UE_1$ in the sidelink acknowledgment portion 712 of the sidelink-centric subframe.

The sidelink-centric subframe may also include an UL portion 714. In some aspects, the UL portion 714 may be a common UL burst or common UL portion, and may be configured the same as or similar to the common UL portion 506, 606 described above with reference to FIGS. 5-6. Notably, as illustrated in the example of FIG. 7, the common UL portion 714 may be included in the end portion of the sidelink-centric subframe. By including the common UL portion 714 in the end portion of the sidelink-centric subframe, the likelihood of interfering with the common UL portion 506, 606 of DL-centric and UL-centric subframes of nominal traffic is minimized. In other words, because the DL-centric subframe, the UL-centric subframe, and the sidelink-centric subframe have their common UL portion 506, 606, 714 communicated during the same or similar portion of their respective subframe, the likelihood of interference between those common UL portions 506, 606, 714 is reduced. That is, the common UL portions 506, 606 of DL-centric and UL-centric subframes (of nominal traffic) are relatively better protected.

Unicast Multi-TTI Transmissions

Figure 8:
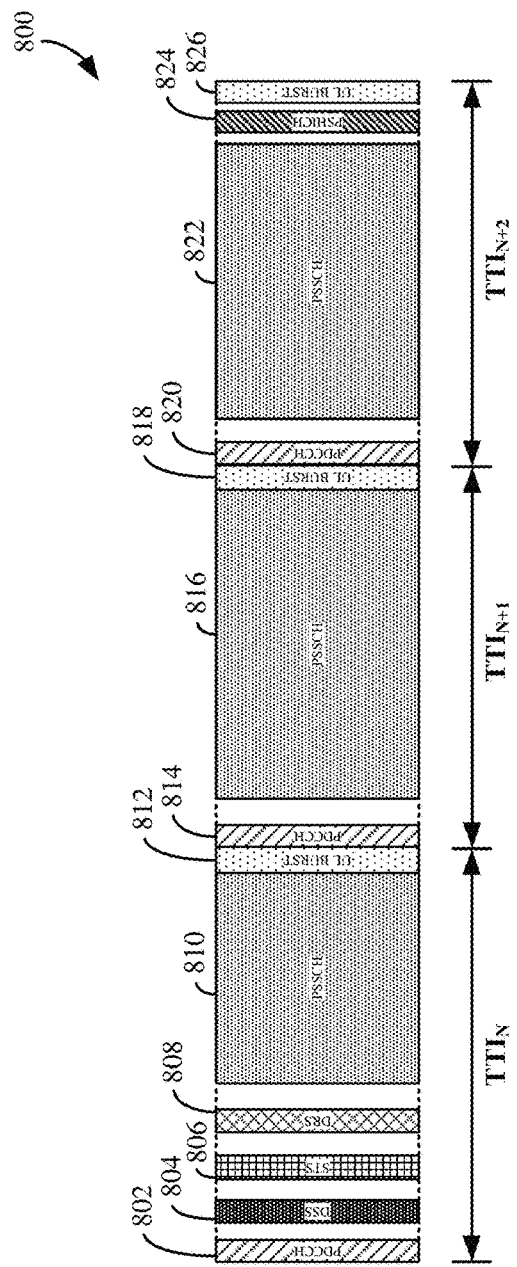
FIG. 8 is a diagram illustrating an example of a sidelink-centric subframe for unicast that includes a plurality of transmission time intervals (TTIs) according to some aspects of the present disclosure.
Figure 9:
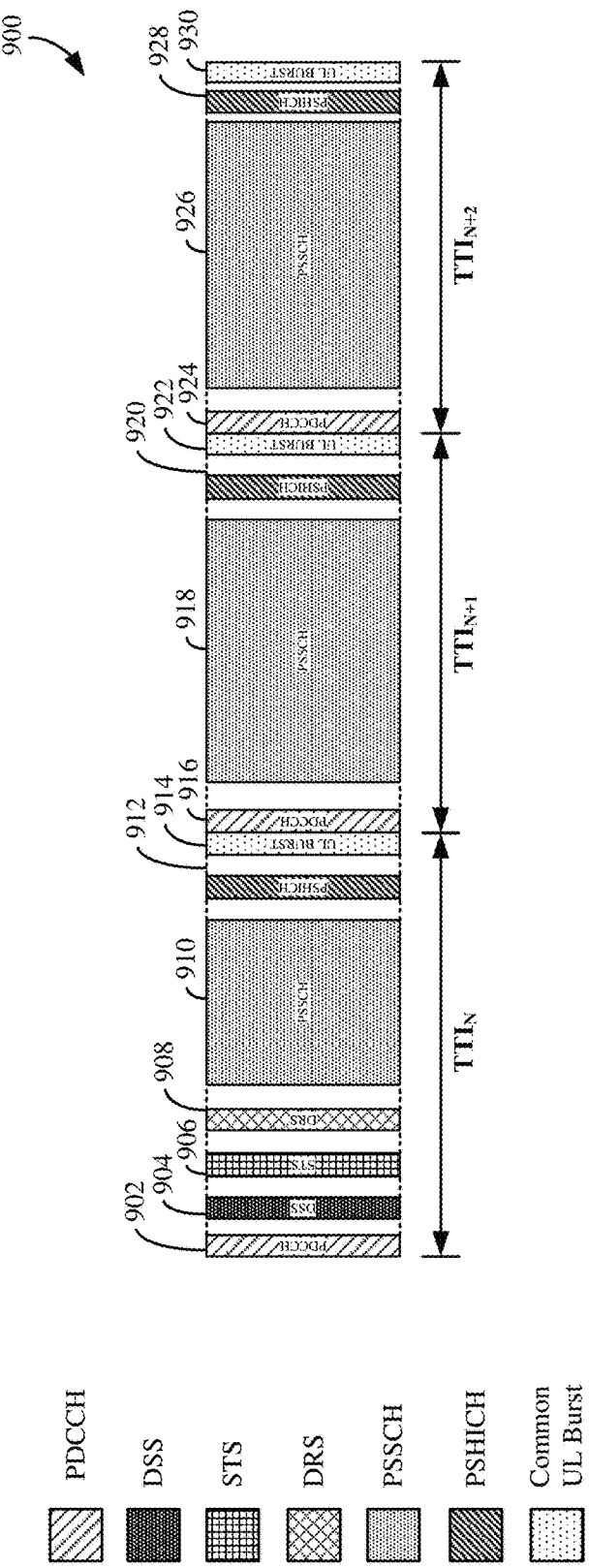
FIG. 9 is a diagram illustrating another example of a sidelink-centric subframe for unicast that includes a plurality of TTIs according to some aspects of the present disclosure.

FIGS. 8-9, described below, illustrate multi-TTI subframes according to some aspects of the disclosure. As with the example described above in relation to FIG. 7, in some configurations, the sidelink-centric subframe 800 in FIG. 8 may be utilized for unicast communication. Although the example illustrated in FIG. 8 shows three TTIs (e.g., $TTI_N$, $TTI_{N+1}$, $TTI_{N+2}$), one of ordinary skill in the art will understand that any plural number of TTIs may be implemented within a sidelink-centric subframe as described herein without deviating from the scope of the present disclosure.

The examples described below in FIGS. 8-9 will be described as a single sidelink-centric subframe including a plurality of TTIs. However, it is to be understood that the definition of subframe within the present disclosure is intended to be broad, and not limiting as to the duration of the sidelink-centric subframe 800 or 900. That is, in some technologies, a subframe may always have a duration of a single TTI. Those of ordinary skill in the art will recognize that this only presents a difference in terminology, and aspects of the present disclosure may apply therein. For example, referring to either FIG. 8 or FIG. 9, it may alternatively be understood that the first TTI (e.g., $TTI_N$) corresponds to a first subframe, and each of the following TTIs (e.g., $TTI_{N+1}$-$TTI_{N+2}$) correspond to subsequent subframes. In this example, the STS/DSS-DRS handshake within the first TTI (e.g., $TTI_N$) or first subframe may reserve the sidelink channel over a plurality of subframes in the same way as described below.

Referring now specifically to FIG. 8, a diagram illustrates an example of a sidelink-centric subframe 800 extending across a plurality of TTIs according to an aspect of the present disclosure. In some configurations, this multi-TTI sidelink-centric subframe may be utilized for unicast communications. Although the example illustrated in FIG. 8 shows three TTIs (e.g., $TTI_N$, $TTI_{N+1}$, $TTI_{N+2}$), one of ordinary skill in the art will understand that any plural number of TTIs may be implemented without deviating from the scope of the present disclosure. The first TTI (e.g., $TTI_N$) may include the control portion 802 (e.g., PDCCH, as described in greater detail above), DSS 804, STS 806, and DRS 808 (as also described in greater detail above).

In this example, the request signal communicated during DSS 1104 and/or STS 806 may indicate a duration that extends across the plurality of TTIs (e.g., $TTI_N$, $TTI_{N+1}$, $TTI_{N+2}$). In other words, the request signal may indicate a requested duration of time to keep the sidelink channel available for sidelink signals, and that requested duration may extend until the end of the last TTI (e.g., $TTI_{N+2}$) of the plurality of TTIs (e.g., $TTI_N$, $TTI_{N+1}$, $TTI_{N+2}$). If the sidelink channel is available for that requested duration of time, then the DRS may be communicated in the DRS portion 808 (as described in greater detail above). Although the plurality of TTIs (e.g., $TTI_N$, $TTI_{N+1}$, $TTI_{N+2}$) each include a sidelink data portion 810, 816, 822, not every TTI necessarily requires DSS 804 and/or STS 806. By not including DSS 804 and/or STS 806 in every TTI of the plurality of TTIs (e.g., $TTI_N$, $TTI_{N+1}$, $TTI_{N+2}$) in the subframe 800, the overall amount of overhead is relatively lower than it would otherwise be (e.g., if DSS 804 and/or STS 806 were included in every TTI). By reducing overhead, relatively more of the TTIs (e.g., $TTI_{N+1}$, $TTI_{N+2}$) lacking DSS 804 and/or STS 806 can be utilized for communication of the sidelink data 816, 822, which thereby increases relative throughput.

Within the first TTI (e.g., TTIN), DSS 804, STS 806, and DRS 808 may be followed by a first sidelink data portion 810 (which is described in greater detail above with reference to the sidelink data portion 710 in FIG. 7). The sidelink data portions 810, 816, 822 may each be followed by respective common UL portions 812, 818, 826 (which are described in greater detail above with reference to the common UL portion 714 in FIG. 7). In the example illustrated in FIG. 8, every TTI (e.g., $TTI_{N+1}$, $TTI_{N+2}$) following the first (e.g., $TTI_N$) includes a control portion 814, 820 at an initial/beginning portion of each subframe/TTI and a common UL portion 818, 826 at the end portion of each subframe/TTI. By providing the control portion 814, 820 at the initial/beginning of each subframe/TTI and providing the common UL portion 818, 826 at the end portion of each subframe/TTI, the sidelink-centric subframes have a structure that minimizes the likelihood of interference with DL/UL control/scheduling information of nominal traffic (as described in greater detail above).

In the example illustrated in FIG. 8, the sidelink-centric subframes include a single sidelink acknowledgment portion 824 in a last/final TTI (e.g., TTIN+2) of the plurality of TTIs (e.g., $TTI_N$, $TTI_{N+1}$, $TTI_{N+2}$). The acknowledgment information communicated in the sidelink acknowledgment portion 824 in the last/final TTI (e.g., $TTI_{N+2}$) may correspond to the sidelink signals included in one or more (e.g., all) preceding sidelink data portions 810, 816, 822. For example, the sidelink acknowledgment portion 824 may include a HARQ identifier corresponding to sidelink signals communicated throughout the sidelink data portions 810, 816, 822 of the plurality of TTIs (e.g., $TTI_N$, $TTI_{N+1}$, $TTI_{N+2}$) in the multi-TTI subframe 800. Because the sidelink acknowledgment portion 824 is not included in every TTI (e.g., $TTI_N$, $TTI_{N+1}$), the overall amount of overhead is relatively lower than it would otherwise be (e.g., if a sidelink acknowledgment portion were included in every TTI). By reducing overhead, relatively more of the TTIs (e.g., $TTI_N$, $TTI_{N+1}$) lacking the sidelink acknowledgment portion 824 can be utilized for communication of sidelink data, which thereby increases relative throughput. However, one of ordinary skill in the art will readily understand that the example illustrated in FIG. 8 is non-limiting and alternative configurations may exist without necessarily deviating from the scope of the present disclosure.

FIG. 9 is a diagram 900 illustrating one example of such an alternative configuration. Various aspects illustrated in FIG. 9 (e.g., control portions 902, 916, 924; DSS 904; STS 906; DRS 908; and common UL portions 914, 922, 930) are described above with reference to FIG. 11 and therefore will not be repeated here to avoid redundancy. An aspect in which the example illustrated in FIG. 9 may differ from the example illustrated in FIG. 8 is that the example in FIG. 9 includes a sidelink acknowledgment portion 912, 920, 928 in every TTI of the plurality of TTIs (e.g., $TTI_N$, $TTI_{N+1}$, $TTI_{N+2}$). For example, each sidelink acknowledgment portion 912, 920, 928 may respectively communicate acknowledgment information corresponding to a sidelink signal include in the sidelink data portion 910, 918, 926 in its TTI. By receiving acknowledgment information corresponding to the sidelink signal in that particular TTI, the scheduled entity 204 (e.g., UE) may obtain relatively better specificity regarding the communication success of each sidelink signal. For example, if only one sidelink signal in a single sidelink data portion (e.g., sidelink data portion 910) is not successfully communicated, retransmission can be limited to only the affected sidelink portion (e.g., sidelink data portion 910) without the burden of retransmitting unaffected sidelink portions (e.g., other sidelink data portions 918, 926).

Broadcast Sidelink Subframe

Figure 10:
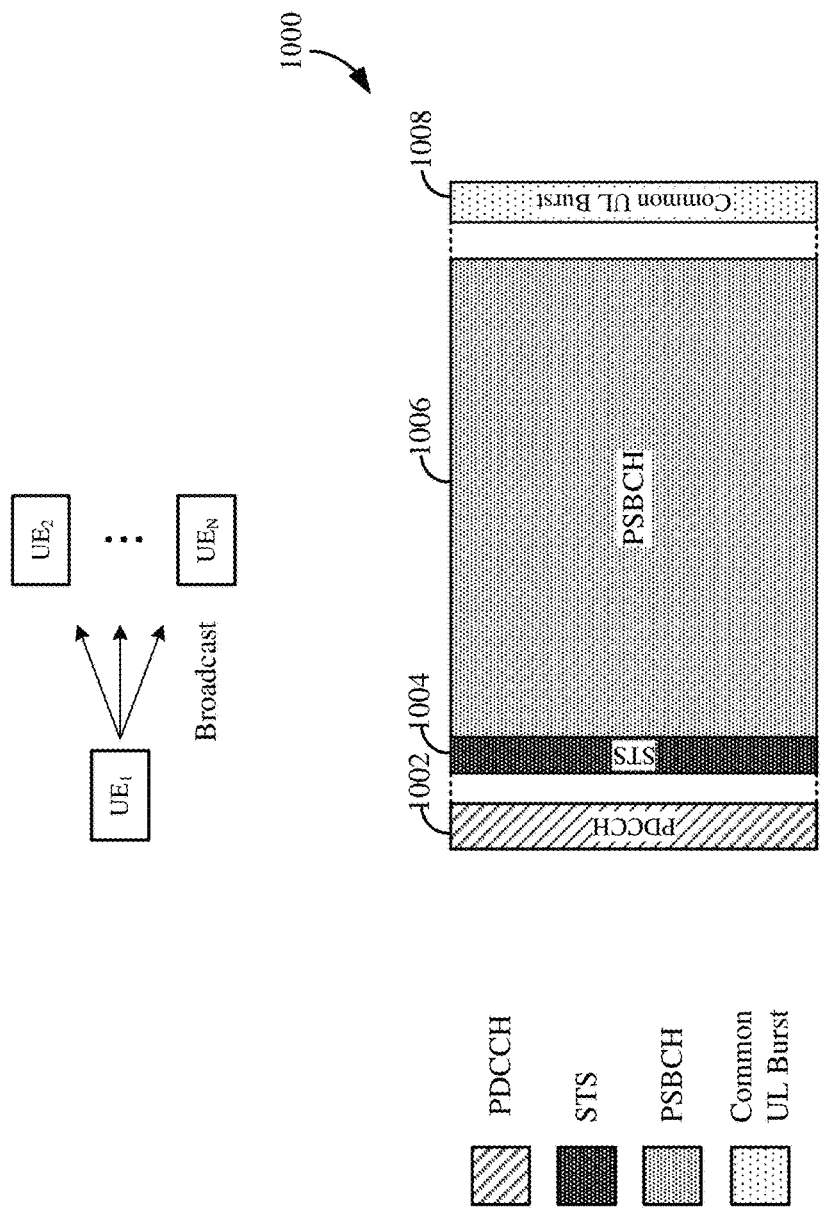
FIG. 10 is a diagram illustrating an example of a sidelink-centric subframe for broadcast according to some aspects of the present disclosure.

FIG. 10 is a diagram illustrating another example of a sidelink-centric subframe 1000 according to some aspects of the present disclosure. In some configurations, this sidelink-centric subframe 1000 may be utilized for broadcast communication. A broadcast communication may refer to a point-to-multipoint transmission by one scheduled entity 204 (e.g., $UE_1$) to a set of one or more scheduled entities 204 (e.g., $UE_2$-$UE_N$). Description corresponding to aspects of a control portion 1002 and common UL portion 1008 are provided above with reference to preceding FIGs. and therefore will not be repeated to avoid redundancy.

The example of the sidelink-centric subframe 1000 illustrated in FIG. 10 includes a source transmit signal (STS) portion 1004. Similar to the STS described above with respect to the unicast sidelink-centric subframe, here, the STS portion 1004 may refer to a portion of the subframe during which one scheduled entity 204 (e.g., UE) communicates a request signal indicating a requested duration of time to keep a sidelink channel available for a sidelink signal. One of ordinary skill in the art will understand that the STS may include various additional or alternative information without necessarily deviating from the scope of the present disclosure. In some configurations, the STS may include a group destination identifier (ID). The group destination ID may correspond to a group or set of one or more devices intended to receive the STS. In some configurations, the STS may indicate a duration of the sidelink transmission, and/or may include a reference signal (RS) to enable channel estimation and RX-yielding (described below), a modulation and coding scheme (MCS) indicator, and/or various other information. In some examples, the STS RS may be transmitted at a higher (e.g., boosted) power level to provide additional protection of the broadcast. Further, the STS MCS indicator may be utilized to inform the receiving device of the MCS utilized for transmissions in the data portion 1006.

A first scheduled entity 204 (e.g., $UE_1$) may broadcast an STS to one or more other scheduled entities 204 (e.g., $UE_2$ ... $UE_N$) to request that the other scheduled entities 204 (e.g., $UE_2$ ... $UE_N$) refrain from using the sidelink channel for the requested duration of time, thereby leaving the sidelink channel available for the first scheduled entity 204 (e.g., $UE_1$). By transmitting the STS, the first scheduled entity 204 (e.g., $UE_1$) can effectively reserve the sidelink channel for a sidelink signal. This enables distributed scheduling and management of interference that might otherwise occur from another sidelink communication from other scheduled entities 204 (e.g., $UE_2$ ... $UE_N$). Put another way, because the other scheduled entities 204 (e.g., $UE_2$ ... $UE_N$) are informed that the first scheduled entity 204 (e.g., $UE_1$) will be transmitting for the requested period of time, the likelihood of interference between sidelink signals is reduced.

The sidelink-centric subframe 1000 may also include a sidelink data portion 1006. The sidelink data portion 1006 may sometimes be referred to as the payload or sidelink-burst of the sidelink-centric subframe. In an example where the sidelink-centric subframe is utilized for broadcast communications, the sidelink data portion 1006 may carry a physical sidelink broadcast channel (PSBCH). The sidelink data portion 1006 may include the communication resources utilized to communicate sidelink data from one scheduled entity 204 (e.g., $UE_1$) to one or more other scheduled entities 204 (e.g., $UE_2$, $UE_3$).

According to a further aspect of the disclosure, a broadcast sidelink-centric subframe may take on certain characteristics based on whether or not the broadcast is separated from other sidelink devices that utilize unicast sidelink-centric subframes as described above. Here, a broadcast sidelink-centric subframe utilized in the absence of unicast sidelink-centric subframe transmissions may be referred to as an orthogonalized broadcast, while a broadcast sidelink-centric subframe utilized in the presence of unicast sidelink-centric subframe transmissions may be referred to as an in-band broadcast.

Figure 11:
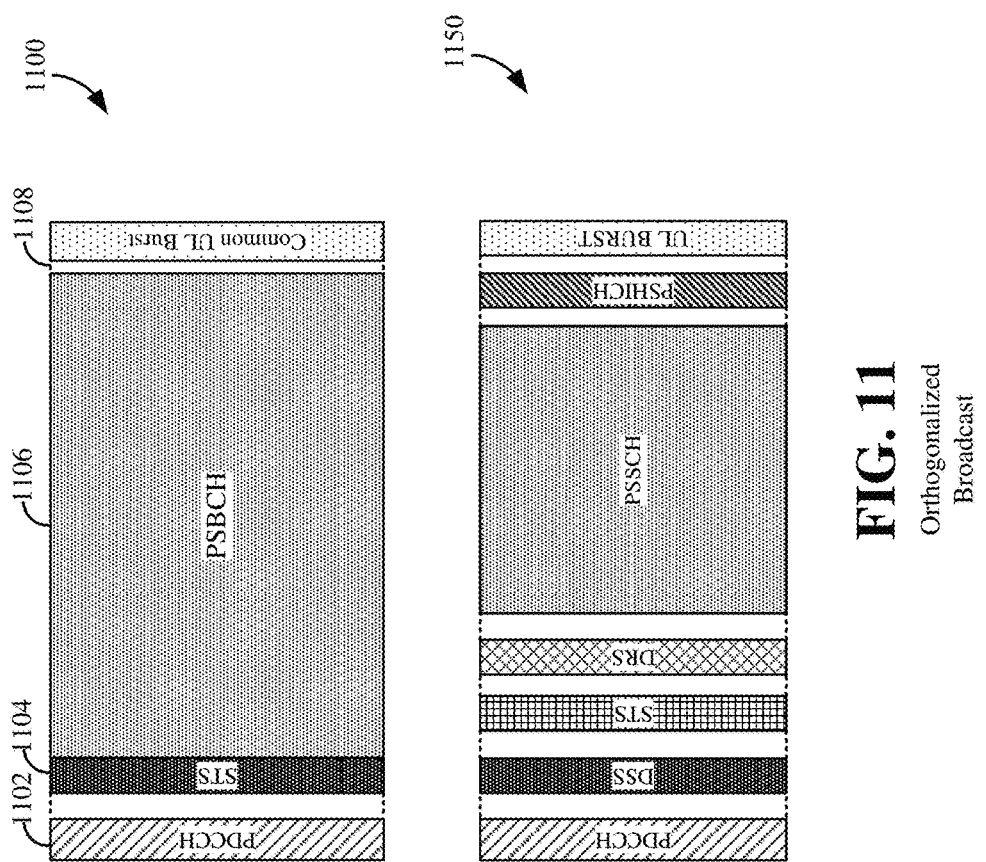
FIG. 11 is a diagram illustrating an example of a sidelink-centric subframe for orthogonalized broadcast according to some aspects of the present disclosure.

For example, FIG. 11 is a diagram illustrating a broadcast sidelink-centric subframe 1100 for orthogonalized broadcast (e.g., in the absence of unicast sidelink-centric subframe transmissions). This illustration shows the broadcast sidelink-centric subframe 1100 aligned with a unicast sidelink-centric subframe 1150 for the purpose of comparison. As seen here, the broadcast sidelink-centric subframe 1100 may include relatively small gaps or guard periods around the STS region 1104 and the control region 1102 and data region 1106. Further, the data region 1106 may fill out most or all of the broadcast sidelink-centric subframe 1100 after the STS region 1104 and before the common UL burst 1108, taking no heed of any potential interference with potentially sensitive control transmissions in a unicast sidelink-centric subframe 1150.

Figure 12:
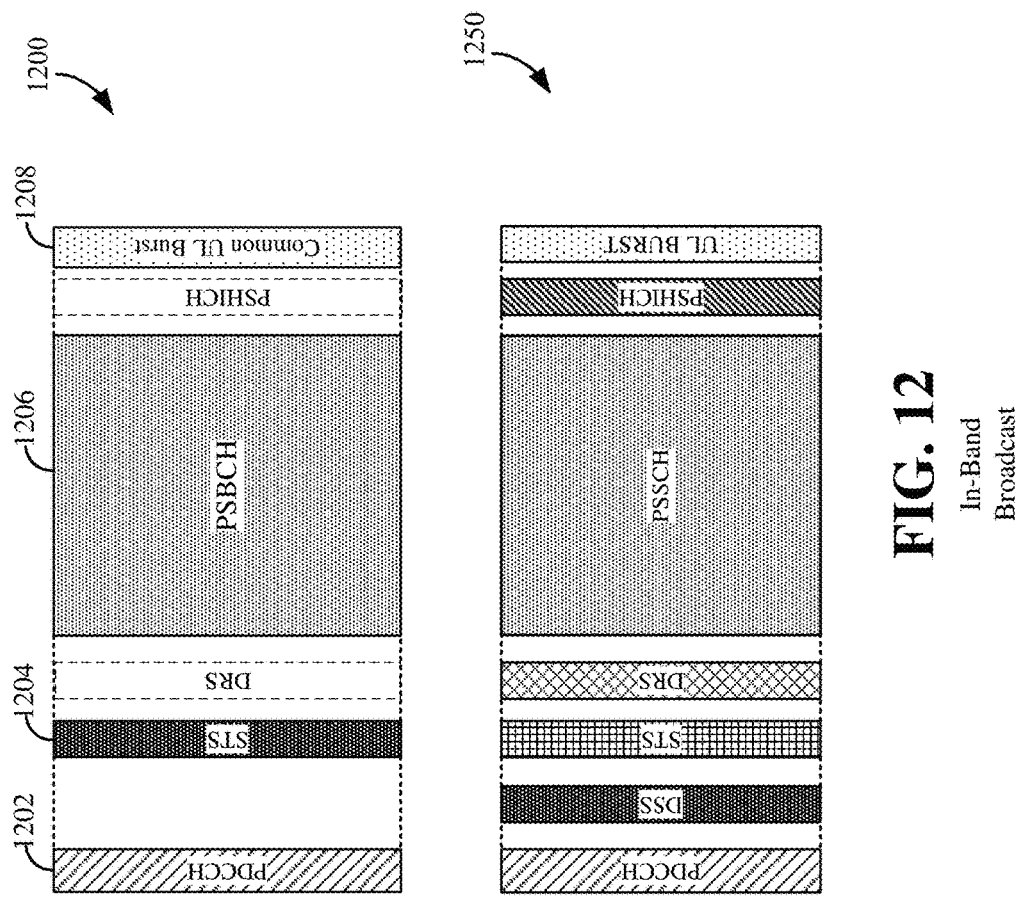
FIG. 12 is a diagram illustrating an example of a sidelink-centric subframe for in-band broadcast according to some aspects of the present disclosure.

FIG. 12 is a diagram illustrating a broadcast sidelink-centric subframe 1200 for in-band broadcast (e.g., in the presence of unicast sidelink-centric subframe transmissions). This illustration also shows the broadcast sidelink-centric subframe 1200 aligned with a unicast sidelink-centric subframe 1250 for the purpose of comparison. As seen here, the broadcast sidelink-centric subframe 1200 may include larger gaps before and after the STS region 1204 of the broadcast sidelink-centric subframe 1200, to protect the DRS and DSS regions of the unicast sidelink-centric subframe transmissions. Furthermore, the broadcast sidelink-centric subframe 1200 may include a larger gap between the sidelink data region 1206 and the common UL burst region 1208 to protect the acknowledgment portion (e.g., PSHICH) of the unicast sidelink-centric subframe transmissions.

In some aspects of the disclosure, a device that is utilizing the broadcast sidelink-centric subframe 1200 may be configured to yield to higher-priority unicast transmissions. Accordingly, the device utilizing the broadcast sidelink-centric subframe 1200 may be configured to monitor for a DSS transmission within a unicast sidelink-centric subframe 1250, reserving the sidelink channel.

In a further aspect of the disclosure, the broadcast sidelink-centric subframe 1200 for in-band broadcast may be modified to include a DRS region and/or an acknowledgment region, as described above in connection with the unicast sidelink-centric subframe. That is, in some examples, a subset of the devices receiving the broadcast transmission may be configured to transmit a DRS to the broadcasting device, informing that device about the availability of the channel. Similarly, in some examples, a subset of the devices receiving the broadcast transmission may be configured to provide the broadcasting device HARQ feedback in a HARQ or acknowledgment region. To accommodate these examples, multiple DRS/HARQ resources may be provisioned for each broadcast.

Broadcast Multi-TTI Transmissions

Figure 13:
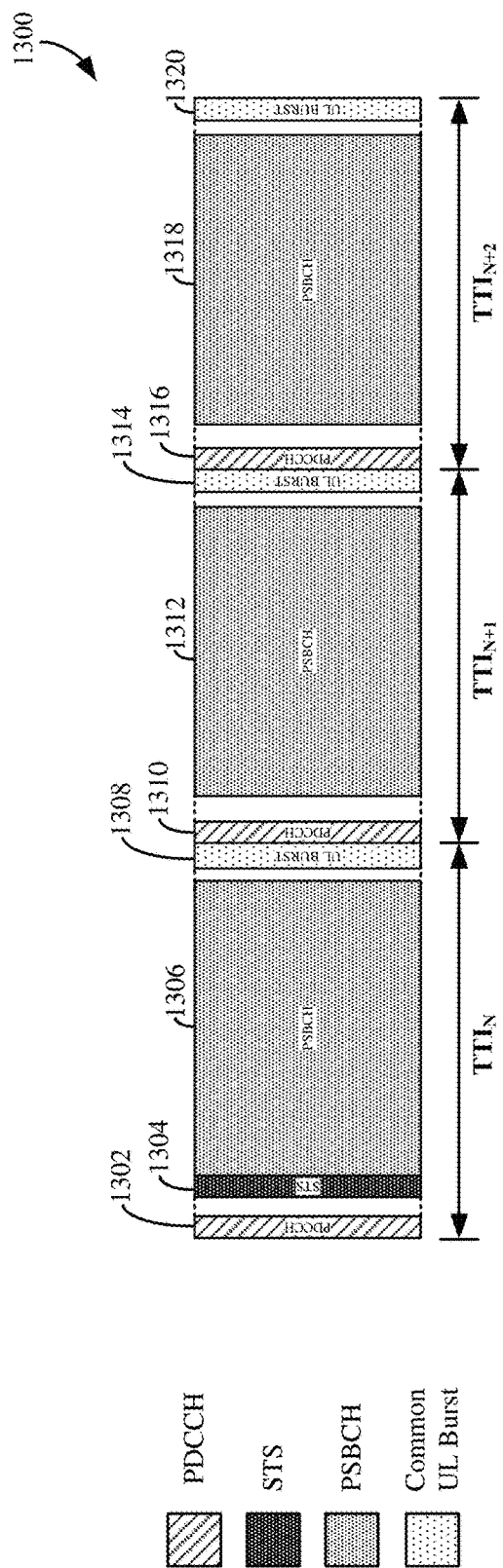
FIG. 13 is a diagram illustrating another example of a sidelink-centric subframe for broadcast that includes a plurality of TTIs according to some aspects of the present disclosure.

FIG. 13 is a diagram illustrating an example of a sidelink-centric subframe 1300 that includes a plurality of TTIs according to some aspects of the disclosure. As with the examples described above in relation to FIGS. 10-12, in some configurations, the sidelink-centric subframe 1300 in FIG. 13 may be utilized for broadcast communication. Although the example illustrated in FIG. 13 shows three TTIs (e.g., TTIN, TTIN+1, TTIN+2), one of ordinary skill in the art will understand that any plural number of TTIs may be implemented within a sidelink-centric subframe as described herein without deviating from the scope of the present disclosure. In FIG. 13, the first TTI (e.g., TTIN) may include a control portion 1302 (e.g., PDCCH, as described in greater detail above) and an STS portion 1304 (as also described in greater detail above). The STS portion 1304 may indicate a duration that extends across the plurality of TTIs (e.g., TTIN, TTIN+1, TTIN+2). In other words, the STS may indicate a requested duration of time to keep the sidelink channel available for broadcast sidelink signals, and that requested duration may extend until the end of the last TTI (e.g., TTIN+2) of the plurality of TTIs (e.g., TTIN, TTIN+1, TTIN+2). Therefore, although the plurality of TTIs (e.g., TTIN, TTIN+1, TTIN+2) each include a sidelink data portion 1306, 1312, 1318, not every TTI necessarily requires the STS portion 1304. By not including the STS portion 1304 in every TTI of the plurality of TTIs (e.g., TTIN, TTIN+1, TTIN+2) in the subframe 1300, the overall amount of overhead is relatively lower than it would otherwise be (e.g., if the STS portion 1304 was included in every TTI). By reducing overhead, relatively more of the TTIs (e.g., TTIN+1, TTIN+2) lacking the STS portion 1304 can be utilized for communication of the sidelink data 1312, 1318, which thereby increases relative throughput.

Within the first TTI (e.g., TTIN), the STS portion 1304 may be followed by a sidelink data portion 1306 (which is described in greater detail above with reference to the sidelink data portion 1006 in FIG. 10). The sidelink data portion 1306 may be followed by the common UL portion 1308 (which is described in greater detail above with reference to the common UL portion 1008 in FIG. 10). In the example illustrated in FIG. 13, every TTI (e.g., TTIN+1, TTIN+2) following the first TTI (e.g., TTIN) includes a control portion 1310, 1316 at an initial/beginning portion of each TTI and a common UL portion 1314, 1320 at the end portion of each TTI. By providing the control portion 1310, 1316 at the initial/beginning of each TTI and providing the common UL portion 1314, 1320 at the end portion of each TTI, the sidelink-centric subframes have a structure that minimizes the likelihood of interference with DL/UL control/scheduling information of nominal traffic (as described in greater detail above).

The example in FIG. 13 has been described as a single sidelink-centric subframe 1300 including a plurality of TTIs. However, it is to be understood that the definition of subframe within the present disclosure is intended to be broad, and not limiting as to the duration of the sidelink-centric subframe 1300. That is, in some technologies, a subframe may always have a duration of a single TTI. Those of ordinary skill in the art will recognize that this only presents a difference in terminology, and aspects of the present disclosure may apply therein. For example, referring to FIG. 13, it may alternatively be understood that the first TTI (e.g., TTIN) corresponds to a first subframe, and each of the following TTIs (e.g., TTIN+1-TTIN+2) correspond to subsequent subframes. In this example, the STS 1304 within the first TTI (e.g., TTIN) or first subframe may reserve the sidelink channel over a plurality of subframes in the same way as described above.

Furthermore, while the illustration in FIG. 13 utilizes the orthogonalized broadcast subframe structure described above and illustrated in FIG. 11, this is merely one example. Those of ordinary skill in the art will recognize that each of the TTIs in FIG. 13 may equivalently utilize the in-band broadcast subframe structure described above and illustrated in FIG. 12.

RX-Yielding and TX-Yielding

Figure 14:
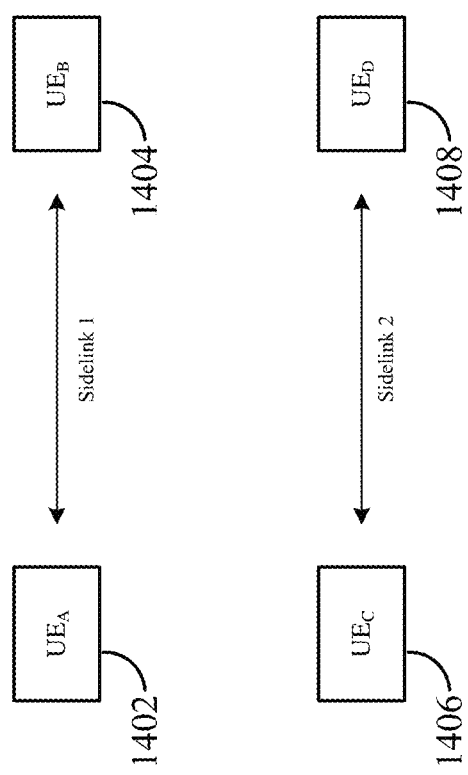
FIG. 14 is a schematic illustration of interfering sidelink transmissions for illustration of TX-yielding and RX-yielding according to some aspects of the present disclosure.

FIG. 14 is a schematic diagram of two sidelink signals between two pairs of UEs or scheduled entities 204, to illustrate receive (RX)-yielding and transmit (TX)-yielding according to various aspects of the present disclosure. FIG. 14 illustrates a first sidelink signal $Sidelink_1$ between $UE_A$ 1402 and $UE_B$ 1404, and a second sidelink signal $Sidelink_2$ between $UE_C$ 1406 and $UE_D$ 1408. In this example, it is assumed that $UE_A$ 1402 has priority access to the sidelink channel (e.g., $Sidelink_1$ has a higher priority than $Sidelink_2$). Broadly, 'priority access' may in some examples refer to an absolute or highest level of priority among a given set of two or more UEs or scheduled entities. In other examples, 'priority access' may refer to a relative priority, where a first UE has priority access from the point of view of a second UE when the first UE has a higher priority than the second UE. In some examples, $UE_A$ may be considered to be a primary sidelink device, while $UE_C$ may be considered to be a non-primary or secondary sidelink device.

In the illustrated example, $UE_A$ and $UE_C$ may concurrently transmit STSs/DSSs identifying $UE_B$ and $UE_D$, respectively. One or both of these transmissions may in some examples be DSSs corresponding to a broadcasted sidelink transmission, where the identified UE is one among a group of UEs identified by a group destination ID in the transmitted DSS. In other examples, one or both of these transmissions may be STSs/DSSs corresponding to a unicasted sidelink transmission, where the identified UE is uniquely identified by a destination ID in the transmitted STS/DSS.

According to an aspect of the disclosure, $UE_D$ 1408 may receive both STS/DSS signals (i.e., one from $UE_A$ 1402 and another from $UE_B$ 1404). Here, one of the STS/DSS signals (e.g., the STS/DSS transmitted by $UE_C$ 1406) may identify $UE_D$, so it may be expected for $UE_D$ 1408 to respond by transmitting a DRS. However, if $UE_D$ 1408 is configured to implement RX-yielding, $UE_D$ 1408 may be configured to detect the STS/DSS transmitted by $UE_A$ 1402. As described above, an STS/DSS may include a reference signal (RS). In some examples, the RS may be configured to indicate an STS/DSS transmission by a device having priority access to the sidelink channel. Accordingly, because $Sidelink_1$ has a higher priority than $Sidelink_2$, $UE_D$ 1408 may refrain from transmitting the DRS. In other words, because $UE_A$ 1402 has priority access to the sidelink channel, $UE_D$ 1408 may forgo to respond to the STS/DSS with a DRS, to reduce interference to the priority sidelink signal. Accordingly, the relatively lower priority sidelink ($Sidelink_2$) yields communication of the DRS, and access to the sidelink channel, under these circumstances.

In a further aspect of the disclosure relating to TX-yielding, in the scenario where $UE_A$ 1402 and $UE_C$ 1406 concurrently transmit respective STSs/DSSs to $UE_B$ 1404 and $UE_D$ 1408, respectively, $UE_B$ 1404 may transmit a DRS. For example, $UE_B$ 1404 may not be configured to implement RX-yielding, and/or $UE_B$ 1404 may determine, based for example on the presence of an RS within the STS/DSS that identifies $UE_B$ 1404, that $Sidelink_1$ has relatively higher priority than $Sidelink_2$. As discussed above, when it transmits the DRS, $UE_B$ 1404 may include a reference signal (RS) that is configured to inform other devices that wish to access the sidelink channel (e.g., $UE_C$ 1406) that it will interfere with their sidelink communication during a particular period of time.

After transmitting its STS/DSS, $UE_C$ 1406 may monitor for a DRS in response. In some examples, $UE_C$ 1406 may receive the DRS from $UE_D$ 1408. However, whether or not it receives the DRS from $UE_D$ 1408, here, $UE_C$ 1406 may receive the DRS from $UE_B$ 1404 including the RS described above. Accordingly, by receiving this RS, $UE_C$ 1406 may determine to refrain from communicating over the sidelink channel for that particular period of time (e.g., at least for the duration of the sidelink communication of $Sidelink_1$). Accordingly, the relatively lower priority sidelink ($Sidelink_2$) yields communication for a particular period of time under these circumstances.

Figure 15:
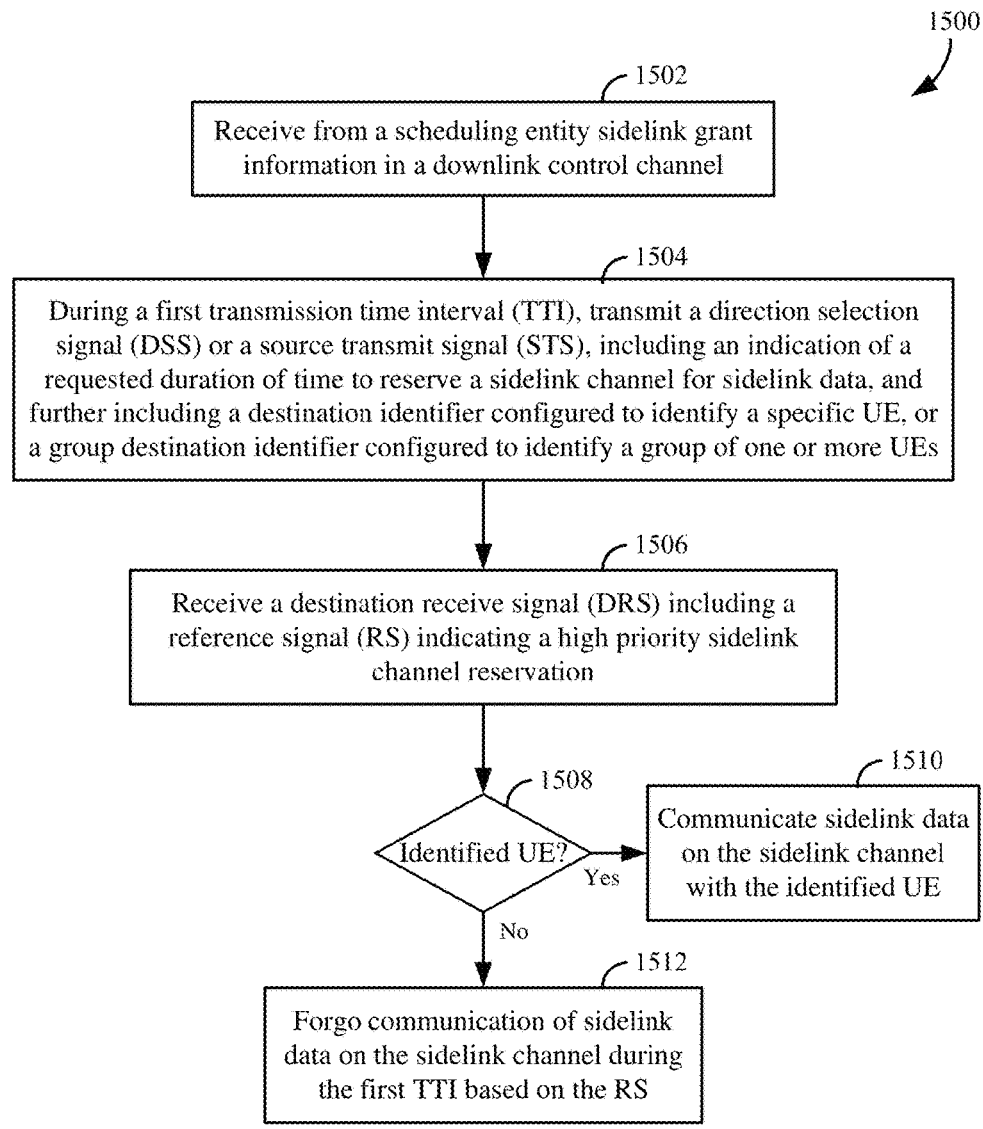
FIG. 15 is a diagram illustrating an example of various methods and/or processes for TX-yielding according to some aspects of the present disclosure.

FIG. 15 is a flow chart illustrating an exemplary process 1500 for TX-yielding in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 204 illustrated in FIGS. 2 and/or 4. In some examples, the process 1500 may be carried out by any suitable apparatus or means for carrying out the functions or algorithm described below.

In each of the process diagrams 15-18, with respect to examples corresponding to a unicast sidelink-centric subframe (note that these figures may additionally or alternatively cover examples corresponding to broadcast sidelink-centric subframes), the DSS/STS format may take either of the formats described above with reference to FIG. 7. That is, the DSS may be utilized for direction selection, while the STS carries the request signal. Alternately, the DSS may be utilized as a request signal from a primary device, and the STS may be utilized as a request signal from a secondary device. For ease of description, the latter example may be described in the respective process diagrams 15-18, but it is to be understood that either example may be utilized within the scope of this disclosure.

At block 1502, a scheduling entity 204 (e.g., a UE) may receive, from a scheduling entity, sidelink grant information in a downlink control channel (e.g., PDCCH). For example, this downlink control channel may be carried in the common control region illustrated at the beginning of each of the illustrated subframes in FIGS. 5-13.

At block 1504, during a first TTI, the UE may transmit a request signal (e.g., a DSS/STS) that includes an indication of a requested duration of time to reserve a sidelink channel for sidelink data. Here, the DSS/STS may further include a destination ID configured to identify a specific UE for unicast transmission, or a group destination ID configured to identify a group of one or more UEs.

At block 1506, the UE may receive a response signal (e.g., a DRS) including an RS that indicates a high-priority sidelink channel reservation. Here, in some cases the received DRS may be received as a response to the DSS/STS from a UE identified either by the destination ID or the group destination ID transmitted in block 1504. In this case, then the process may proceed to block 1510, and the UE may communicate sidelink data on the sidelink channel with the identified UE.

However, in other examples the received DRS may be received from an interfering UE. That is, the received DRS may include information (such as a source ID and/or a destination ID) that is not among the UE or UEs targeted in the destination ID or group destination ID in the DSS/STS. Furthermore, in some examples, the RS included in the received DRS, which indicates a high priority sidelink channel reservation, may indicate a higher priority reservation than the priority of this device, which is attempting to reserve the sidelink.

Accordingly, even if this UE does receive a DRS from its own target UE (or UEs), at block 1512, the UE may forgo communication of sidelink data on the sidelink channel during the first TTI, based on this RS indicating a high-priority reservation by another device. In other words, the UE may yield its transmission to make way for the high-priority transmission on the sidelink channel.

Figure 16:
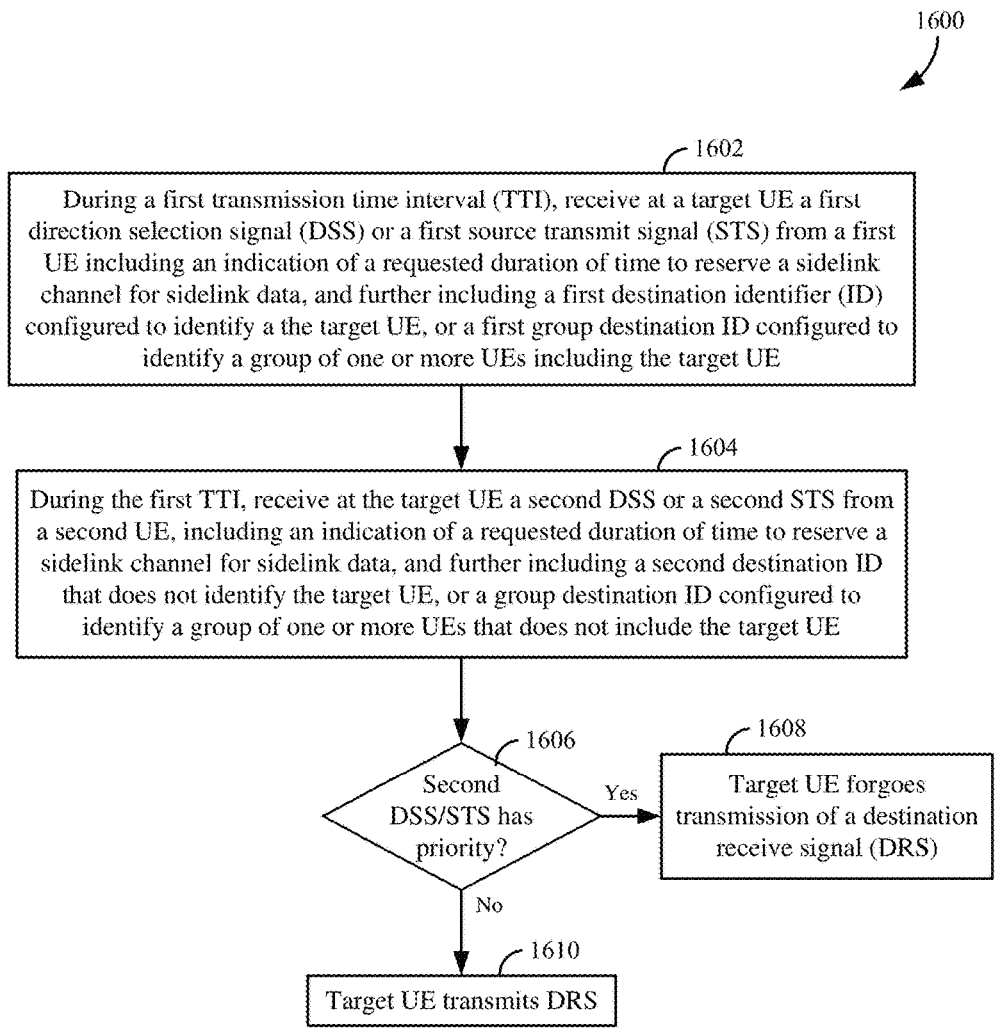
FIG. 16 is a diagram illustrating an example of various methods and/or processes for RX-yielding according to some aspects of the present disclosure.

FIG. 16 is a flow chart illustrating an exemplary process 1500 for RX-yielding in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity 204 illustrated in FIGS. 2 and/or 4. In some examples, the process 1600 may be carried out by any suitable apparatus or means for carrying out the functions or algorithm described below.

At block 1602, a target UE may receive a request signal (e.g., a DSS/STS) from a first UE during a first TTI. Here, the DSS/STS may include an indication of a requested duration of time to reserve a sidelink channel for sidelink data. The DSS/STS may further include a first destination ID or a first group destination ID configured to identify the target UE or a group of UEs, including the first UE.

At block 1604, still during the first TTI, the target UE may receive a second DSS/STS from a second UE. Here, the second DSS/STS may include an indication of a requested duration of time to reserve a sidelink channel for sidelink data. The second DSS/STS may further include a second destination ID or a second group destination ID, either of which does not identify the target UE.

At decision block 1606, the target UE may determine whether the second DSS/STS has higher priority than the sidelink channel being requested for the target UE. If the second DSS/STS has higher priority, then the process may proceed to block 1608 where the target UE may forgo transmission of a DRS. In this way, the target UE may yield its reception of sidelink data to the higher priority sidelink connection.

If the second DSS/STS does not have higher priority, then the process may proceed to block 1610, and the target UE may transmit a response signal (e.g., a DRS) to complete the handshake with the first UE and to begin communication on the sidelink channel.

Figure 17:
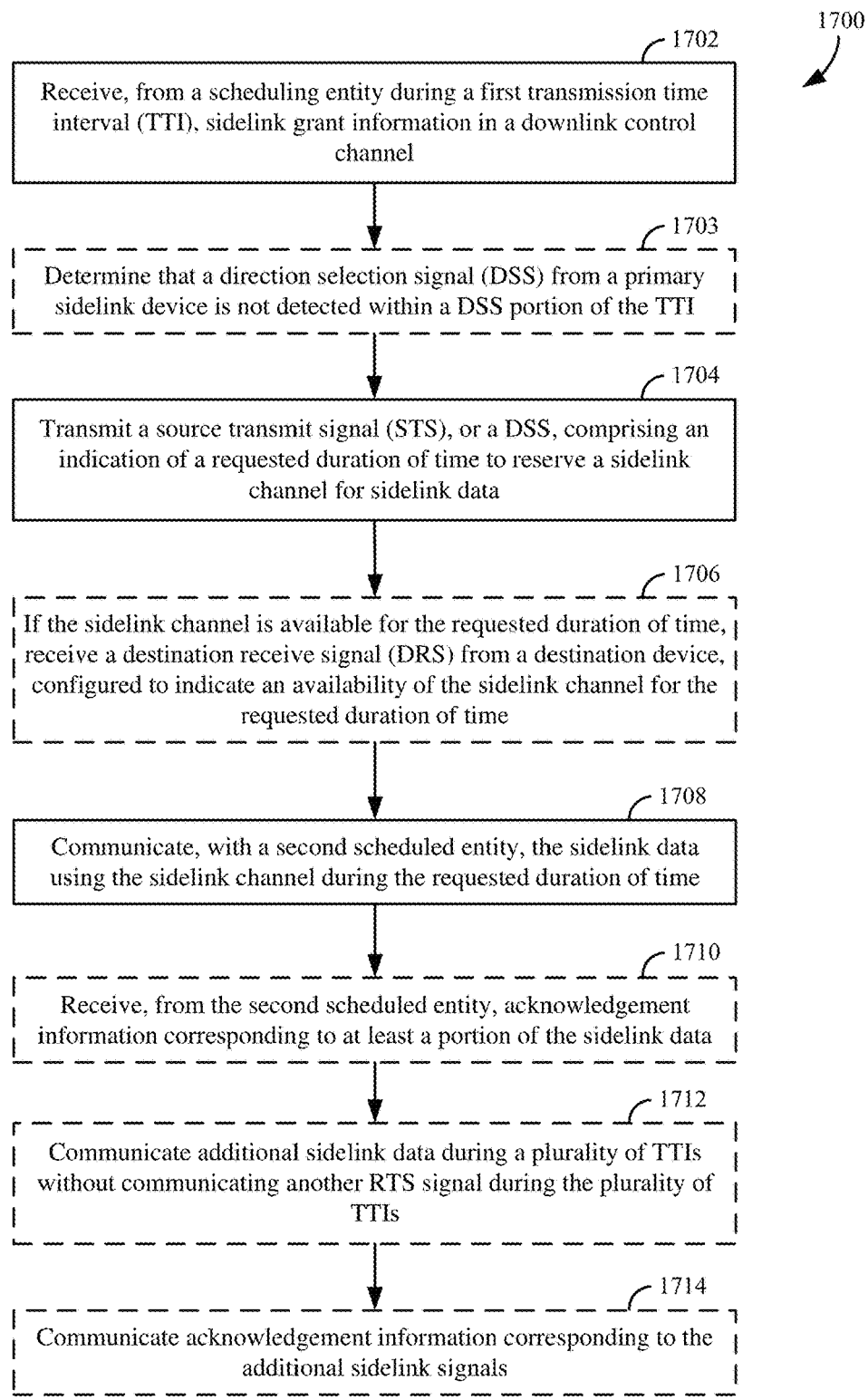
FIG. 17 is a diagram illustrating an example of various methods and/or processes for a transmitting sidelink device according to some aspects of the present disclosure.

FIG. 17 is a diagram 1700 illustrating an example of various methods and/or processes according to some aspects of the present disclosure. In some configurations, such methods and/or processes may be performed by and/or implemented in the scheduled entity 204 (e.g., UE). Although the description provided below with reference to FIG. 17 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference FIG. 17 may be included in, added to, substituted for, or incorporated into, and/or otherwise used to modify any other aspect(s) described with reference to FIGS. 1-14 without necessarily deviating from the scope of the present disclosure.

At block 1702, the UE may receive, from a scheduling entity 202, sidelink grant information in a DL control channel. For example, referring to FIG. 7, the UE may receive sidelink grant information in the control portion 702 (e.g., PDCCH) of the sidelink-centric subframe.

In some configurations (e.g., corresponding to a secondary sidelink device), at block 1703, the UE may monitor for a primary request signal (e.g., a DSS) in a DSS portion of the TTI. In this way, the UE may determine whether a DSS is detected. If a DSS is detected, then the UE may forgo to communicate using the sidelink channel, since the reception of the DSS indicates that the sidelink channel is not available. If the DSS is not detected within the DSS portion of the TTI, then the process may proceed to block 1704.

At block 1704, the UE may transmit a request signal (e.g., an STS or DSS) including an indication of a requested duration of time to reserve a sidelink channel for sidelink data. For example, referring to FIG. 10, for an example utilizing a broadcast transmission, the UE may transmit the STS in the STS portion 1004 of the sidelink-centric subframe. In another example, referring to FIG. 7, for an example utilizing a unicast transmission, the UE may transmit a DSS (if the UE is a primary sidelink device) or an STS (if the UE is a non-primary, or secondary sidelink device and no DSS was detected in block 1703) in the DSS portion 704 or the STS portion 706, respectively, of the sidelink-centric subframe.

In an example utilizing unicast transmission (e.g., see FIG. 7), if the sidelink channel is available for the requested duration of time, then at block 1706, the UE may receive a response signal (e.g., a DRS) from a destination device, where the DRS is configured to indicate an availability of the sidelink channel for the requested duration of time. For example, referring to FIG. 7, the UE may receive the DRS in the DRS portion 708 of the sidelink-centric subframe. Block 1706 is an optional block, generally applicable to unicast transmissions. That is, as described above with reference to FIGS. 10-13, a sidelink broadcast may not necessarily rely on a DRS indicating availability of the sidelink channel. However, as described above, in some examples, a subset of devices utilizing the broadcast sidelink-centric subframe may utilize the DRS as described above.

Subsequently, at block 1708, the UE may communicate, with a second UE or scheduled entity, the sidelink data using the sidelink channel during the requested duration of time. For example, referring to FIG. 10, the UE may broadcast a sidelink signal in the sidelink data portion 1006 (e.g., PSBCH) of the sidelink-centric subframe. In another example, referring to FIG. 7, the UE may unicast a sidelink signal in the sidelink data portion 710 (e.g., PSSCH) of the sidelink-centric subframe.

In some configurations (e.g., corresponding to unicast transmissions), at block 1710, the UE may receive from the second UE or scheduled entity acknowledgment information corresponding to at least a portion of the sidelink data. For example, referring to FIG. 7, the UE may communicate (e.g., receive) an ACK signal, a NACK signal, and/or a HARQ indicator in the sidelink acknowledgment portion 712 (e.g., PSHICH) of the sidelink-centric subframe.

In certain circumstances, the requested duration of time indicated in the STS/DSS may extend across a plurality of TTIs. For example, a sidelink-centric subframe may include a plurality of TTIs, as illustrated in various examples described above with reference to FIGS. 8,9, and 13.

In some configurations (e.g., corresponding to a multi-TTI sidelink transmission), at block 1712, the UE may communicate additional sidelink data during a plurality of TTIs without communicating another STS/DSS within that plurality of TTIs. For example, referring to FIG. 13, the UE may communicate additional sidelink data during additional sidelink data portions 1312, 1318 of TTIN+1, TTIN+2, but the STS portion 1304 is not repeated in any other TTI (e.g., TTIN+1, TTIN+2) other than the first TTI (TTIN). In another example, referring to FIG. 8, the UE may communicate additional sidelink data during additional sidelink data portions 816, 822 of TTIN+1, TTIN+2, but the STS/DSS portions 804 and 806 are not repeated in any other TTI (e.g., TTIN+1, TTIN+2) other than the first TTI (TTIN). In still another example, referring to FIG. 9, the UE may communicate additional sidelink data during additional sidelink data portions 918, 926 of TTIN+1, TTIN+2, but the STS/DSS portions 904 and 906 are not repeated in any other TTI (e.g., TTIN+1, TTIN+2) other than the first TTI (TTIN).

In some configurations (e.g., corresponding to unicast multi-TTI sidelink transmissions), at block 1714, the UE may communicate acknowledgment information corresponding to the additional sidelink data. In some examples, the acknowledgment information for a plurality of TTIs within a multi-TTI sidelink transmission may be communicated in a final/last TTI of the multi-TTI sidelink transmission, such as the sidelink acknowledgment portion 824 in TTIN+2, illustrated in FIG. 8. In some other examples, the acknowledgment information may be communicated in every TTI, such as the sidelink acknowledgment portions 912, 920, 928 in TTIN, TTIN+1, TTIN+2, as illustrated in FIG. 12.

Figure 18:
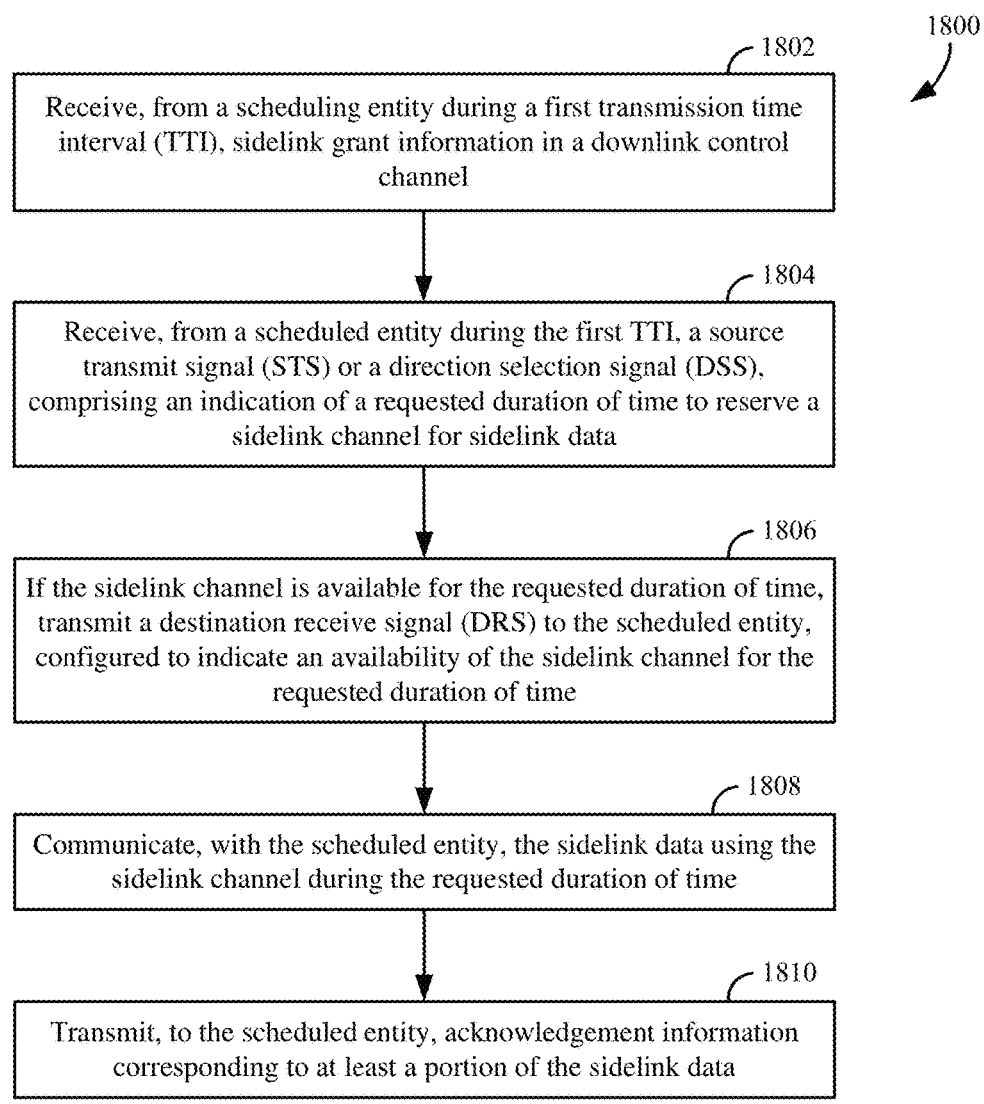
FIG. 18 is a diagram illustrating an example of various methods and/or processes for a receiving sidelink device according to some aspects of the present disclosure.

FIG. 18 is a flow chart illustrating an exemplary process 1800 in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity 204 illustrated in FIGS. 2 and/or 4. In some examples, the process 1800 may be carried out by any suitable apparatus or means for carrying out the functions or algorithm described below.

At block 1802, a scheduled entity or UE may receive, from a scheduling entity 202 during a first TTI, sidelink grant information in a downlink control channel (e.g., the PDCCH). At block 1804, during the first TTI, the UE may receive from a second scheduled entity a request signal (e.g., a DSS/STS) including an indication of a requested duration of time to reserve a sidelink channel for sidelink data.

At block 1806, if the sidelink channel is available for the requested duration of time, the UE may transmit a response signal (e.g., a DRS) to the second scheduled entity. Here, the DRS may be configured to indicate an availability of the sidelink channel for the requested duration of time. Accordingly, at block 1808, the UE may communicate with the second scheduled entity using the sidelink channel during the requested duration of time. As a part of this communication, at block 1810, the UE may transmit to the second scheduled entity HARQ acknowledgment information corresponding to at least a portion of the sidelink data.

In one configuration, the scheduled entity 204 for wireless communication includes means for receiving sidelink grant information, means for transmitting a request signal, means for receiving a response signal, and means for communicating with a second scheduled entity 204 using the sidelink channel. In another configuration, the scheduled entity 204 for wireless communication includes means for receiving a request signal, means for transmitting a response signal. In one aspect, the aforementioned means may be the processor(s) 404 (e.g., including a communication circuit 440) configured to perform the functions recited by the aforementioned means. In another aspect, the aforementioned means may be a circuit or any apparatus configured to perform the functions recited by the aforementioned means.

In one configuration, the scheduled entity 204 for wireless communication includes means for determining whether a primary request signal is detected. In one aspect, the aforementioned means may be the processor(s) 404 (e.g., including a processing circuit 442) configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIG. 1, 2, 3, or 4, and utilizing, for example, the processes and/or algorithms described herein in relation to FIGS. 7-13 and/or 15-18.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure. In each of these examples, when referring to a UE or scheduled entity 204, these actions may be carried out by the transceiver 410.

Although the examples described herein (e.g., with reference to FIGS. 15-18) may describe certain features, operations, processes, methods, and/or aspects from the perspective of a scheduled entity 204 (e.g., UE), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of sidelink communication by a first scheduled entity, the method comprising:
   receiving, from a scheduling entity, sidelink grant information in a downlink control channel;
   after receiving the sidelink grant information in the downlink control channel, transmitting a request signal comprising an indication of a requested duration of time to reserve a sidelink channel for sidelink data; and
   communicating, with a second scheduled entity, the sidelink data using the sidelink channel during the requested duration of time,
   wherein the receiving the sidelink grant information from the scheduling entity, the transmitting the request signal to the second scheduled entity, and the communicating the sidelink data with the second scheduled entity occur in a single transmission time interval (TTI) consisting of a single subframe.

2. The method of claim 1, further comprising:
   receiving a response signal from the second scheduled entity in response to the request signal, the response signal configured to indicate an availability of the sidelink channel for the requested duration of time,
   wherein the receiving the response signal occurs in the single TTI.

3. The method of claim 1, further comprising:
   communicating, with the second scheduled entity, acknowledgment information corresponding to at least a portion of the sidelink data,
   wherein the communicating the acknowledgment information occurs in the single TTI.

4. The method of claim 1, further comprising:
   prior to the transmitting the request signal, determining that a primary request signal is not detected within a primary request portion of the single TTI, the primary request signal corresponding to an indication of a request for the sidelink channel from a third scheduled entity having priority access to the sidelink channel.

5. The method of claim 1, wherein the requested duration of time indicated in the request signal comprises a plurality of TTIs including the single TTI, the method further comprising:
   communicating additional sidelink data during the plurality of TTIs without transmitting another request signal during the plurality of TTIs.

6. The method of claim 5, further comprising:
   communicating acknowledgment information corresponding to the sidelink data or the additional sidelink data in each TTI of the plurality of TTIs.

7. The method of claim 5, further comprising:
   communicating acknowledgment information corresponding to the sidelink data and the additional sidelink data, in a final TTI of the plurality of TTIs.

8. The method of claim 1, wherein the requested duration of time indicated in the request signal comprises a plurality of TTIs including the single TTI, the method further comprising:
   receiving a response signal from the second scheduled entity during the single TTI in response to the request signal, the response signal configured to indicate an availability of the sidelink channel for the requested duration of time; and
   communicating additional sidelink data during the plurality of TTIs without receiving a second response signal during any of the plurality of TTIs other than the single TTI.

9. The method of claim 1, wherein the request signal further comprises a group destination identifier that identifies a group of one or more scheduled entities, the group including the second scheduled entity; and
   wherein the communicating with the second scheduled entity comprises broadcasting the sidelink data to the group of one or more scheduled entities.

10. The method of claim 1, further comprising:
    transmitting a direction selection signal during the single TTI, the direction selection signal comprising a destination identifier and a direction indication for a direction of the sidelink data.

11. A first scheduled entity configured for sidelink communication, comprising:
    a processor;
    a memory communicatively coupled to the processor; and a transceiver communicatively coupled to the processor, wherein the processor is configured to:

receive, from a scheduling entity via the transceiver, sidelink grant information in a downlink control channel;

after receiving the sidelink grant information in the downlink control channel, transmit a request signal via the transceiver, the request signal comprising an indication of a requested duration of time to reserve a sidelink channel for sidelink data; and communicate with a second scheduled entity, via the transceiver, the sidelink data using the sidelink channel during the requested duration of time, wherein the receiving the sidelink grant information from the scheduling entity, the transmitting the request signal to the second scheduled entity, and the communicating the sidelink data with the second scheduled entity occur in a single transmission time interval (TTI) consisting of a single subframe.

12. The first scheduled entity of claim 11, wherein the processor is further configured to:

receive a response signal from the second scheduled entity via the transceiver in response to the request signal, the response signal configured to indicate an availability of the sidelink channel for the requested duration of time, wherein the receiving the response signal occurs in the single TTI.

13. The first scheduled entity of claim 11, wherein the processor is further configured to:

communicate with the second scheduled entity, via the transceiver, acknowledgment information corresponding to at least a portion of the sidelink data, wherein the communicating the acknowledgment information occurs in the single TTI.

14. The first scheduled entity of claim 11, wherein the processor is further configured to:

prior to the transmitting the request signal, determine that a primary request signal is not detected by the transceiver within a primary request portion of the single TTI, the primary request signal corresponding to an indication of a request for the sidelink channel from a third scheduled entity having priority access to the sidelink channel.

15. The first scheduled entity of claim 11, wherein the requested duration of time indicated in the request signal comprises a plurality of TTIs including the single TTI, and wherein the processor is further configured to:

communicate additional sidelink data via the transceiver during the plurality of TTIs without transmitting another request signal via the transceiver during the plurality of TTIs.

16. The first scheduled entity of claim 15, wherein the processor is further configured to:

communicate acknowledgment information via the transceiver, the acknowledgment information corresponding to the sidelink data or the additional sidelink data in each TTI of the plurality of TTIs.

17. The first scheduled entity of claim 15, wherein the processor is further configured to:

communicate acknowledgment information via the transceiver, the acknowledgment information corresponding to the sidelink data and the additional sidelink data, in a final TTI of the plurality of TTIs.

18. The first scheduled entity of claim 11, wherein the requested duration of time indicated in the request signal comprises a plurality of TTIs including the single TTI, and wherein the processor is further configured to:

receive a response signal from the second scheduled entity via the transceiver during the single TTI in response to the request signal, the response signal configured to indicate an availability of the sidelink channel for the requested duration of time; and communicate additional sidelink data via the transceiver during the plurality of TTIs without receiving a second response signal during any of the plurality of TTIs other than the single TTI.

19. The first scheduled entity of claim 11, wherein the request signal further comprises a group destination identifier that identifies a group of one or more scheduled entities, the group including the second scheduled entity; and wherein the processor, being configured to communicate with the second scheduled entity, is further configured to broadcast the sidelink data via the transceiver to the group of one or more scheduled entities.

20. The first scheduled entity of claim 11, wherein the processor is further configured to:

transmit a direction selection signal via the transceiver during the single TTI, the direction selection signal comprising a destination identifier and a direction indication for a direction of the sidelink data.

21. A non-transitory computer-readable medium storing computer executable code at a first scheduled entity, the computer-executable code comprising:

instructions for causing the first scheduled entity to receive, from a scheduling entity, sidelink grant information in a downlink control channel;

instructions for causing the first scheduled entity, after receiving the sidelink grant information in the downlink control channel, to transmit a request signal comprising an indication of a requested duration of time to reserve a sidelink channel for sidelink data; and instructions for causing the first scheduled entity to communicate, with a second scheduled entity, the sidelink data using the sidelink channel during the requested duration of time, wherein the receiving the sidelink grant information from the scheduling entity, the transmitting the request signal to the second scheduled entity, and the communicating the sidelink data with the second scheduled entity occur in a single transmission time interval (TTI) consisting of a single subframe.

22. The computer-readable medium of claim 21, further comprising:

instructions for causing the first scheduled entity, prior to the transmitting the request signal, to determine that a primary request signal is not detected within a primary request portion of the single TTI, the primary request signal corresponding to an indication of a request for the sidelink channel from a third scheduled entity having priority access to the sidelink channel.

23. The computer-readable medium of claim 21, wherein the requested duration of time indicated in the request signal comprises a plurality of TTIs including the single TTI, and wherein the computer-executable code further comprises:

instructions for causing the first scheduled entity to communicate additional sidelink data during the plurality of TTIs without transmitting another request signal during the plurality of TTIs.

24. The computer-readable medium of claim 21, wherein the request signal further comprises a group destination identifier that identifies a group of one or more scheduled entities, the group including the second scheduled entity; and wherein the instructions for causing the first scheduled entity to communicate with the second scheduled entity comprise instructions for causing the first scheduled entity to broadcast the sidelink data to the group of one or more scheduled entities.

25. The computer-readable medium of claim 21, wherein the computer-executable code further comprises:

instructions for causing the first scheduled entity to transmit a direction selection signal during the single TTI, the direction selection signal comprising a destination identifier and a direction indication for a direction of the sidelink data.

26. A first scheduled entity configured for sidelink communication, the first scheduled entity comprising:

means for receiving, from a scheduling entity, sidelink grant information in a downlink control channel;

means for, after receiving the sidelink grant information in the downlink control channel, transmitting a request signal comprising an indication of a requested duration of time to reserve a sidelink channel for sidelink data; and means for communicating, with a second scheduled entity, the sidelink data using the sidelink channel during the requested duration of time, wherein the receiving the sidelink grant information from the scheduling entity, the transmitting the request signal to the second scheduled entity, and the communicating the sidelink data with the second scheduled entity occur in a single transmission time interval (TTI) consisting of a single subframe.

27. The first scheduled entity of claim 26, wherein the requested duration of time indicated in the request signal comprises a plurality of TTIs including the single TTI, the first scheduled entity further comprising:

means for communicating additional sidelink data during the plurality of TTIs without transmitting another request signal during the plurality of TTIs.

28. The first scheduled entity of claim 26, wherein the requested duration of time indicated in the request signal comprises a plurality of TTIs including the single TTI, the method further comprising:

means for receiving a response signal from the second scheduled entity during the single TTI in response to the request signal, the response signal configured to indicate an availability of the sidelink channel for the requested duration of time; and means for communicating additional sidelink data during the plurality of TTIs without receiving a second response signal during any of the plurality of TTIs other than the single TTI.

29. The first scheduled entity of claim 26, wherein the request signal further comprises a group destination identifier that identifies a group of one or more scheduled entities, the group including the second scheduled entity; and wherein the means for communicating with the second scheduled entity is configured for broadcasting the sidelink data to the group of one or more scheduled entities.

30. The first scheduled entity of claim 26, further comprising:

means for transmitting a direction selection signal during the single TTI, the direction selection signal comprising a destination identifier and a direction indication for a direction of the sidelink data.

* * * * *